United States Patent
Gibbons, Jr. et al.

(10) Patent No.: US 10,867,040 B2
(45) Date of Patent: Dec. 15, 2020

(54) SYSTEMS AND METHODS FOR DETECTING RANSOMWARE INFECTION

(71) Applicant: Datto, Inc., Norwalk, CT (US)

(72) Inventors: Robert John Gibbons, Jr., Norwalk, CT (US); Kristen Helene Costagliola, Stamford, CT (US); Christopher James Henderson, Newtown, CT (US)

(73) Assignee: DATTO, INC., Norwalk, CT (US)

( * ) Notice: Subject to any disclaimer, the term of this patent is extended or adjusted under 35 U.S.C. 154(b) by 27 days.

(21) Appl. No.: 15/786,044

(22) Filed: Oct. 17, 2017

(65) Prior Publication Data

US 2018/0107824 A1    Apr. 19, 2018

Related U.S. Application Data

(60) Provisional application No. 62/408,940, filed on Oct. 17, 2016.

(51) Int. Cl.
*G06F 21/56* (2013.01)
*G06F 21/55* (2013.01)

(52) U.S. Cl.
CPC .......... *G06F 21/565* (2013.01); *G06F 21/552* (2013.01)

(58) Field of Classification Search
CPC ............................. G06F 21/565; G06F 21/552
See application file for complete search history.

(56) References Cited

U.S. PATENT DOCUMENTS

| | | |
|---|---|---|
| 9,053,216 B1 | 6/2015 | Coleman et al. |
| 9,323,638 B2 | 4/2016 | Coleman et al. |
| 9,734,337 B1* | 8/2017 | Patton .................. G06F 21/568 |
| 2011/0107043 A1* | 5/2011 | Palagummi ............. G06F 16/22 711/162 |
| 2013/0326625 A1* | 12/2013 | Anderson ............... G06F 21/56 726/23 |

(Continued)

OTHER PUBLICATIONS

Nolen Scaife, "CryptoLock (and Drop It): Stopping Ransomware Attacks on User Data", Jun. 2016, 2016 IEEE 36th International Conference on Distributed Computing Systems, 10 pages (Year: 2016).*

(Continued)

*Primary Examiner* — Chau Le
*Assistant Examiner* — Han Yang
(74) *Attorney, Agent, or Firm* — Fay Sharpe LLP

(57) ABSTRACT

The present disclosure is directed at systems and methods for detecting ransomware infection in filesystems. These systems and methods may enable a computer user to detect a ransomware infection within a filesystem utilizing a snapshot image-based backup. According to some embodiments, the disclosed systems and methods analyze metadata describing the contents of an examined filesystem embodied in a Master File Table (MFT). Also according to some embodiments, the disclosed systems and methods compute an entropy associated with an extracted sample of files to distinguish between infected and uninfected file systems. Relative to other techniques, the disclosed systems/methods can decrease the time and/or computational resources required to detect ransomware, while also decreasing false positives and false negatives.

18 Claims, 16 Drawing Sheets

(56) References Cited

U.S. PATENT DOCUMENTS

| | | |
|---|---|---|
| 2015/0254566 A1* | 9/2015 | Chandramouli ........ G06F 17/27 706/11 |
| 2017/0177452 A1* | 6/2017 | Parab ...................... G06F 16/13 |
| 2017/0223031 A1* | 8/2017 | Gu .......................... G06F 3/0623 |
| 2018/0024893 A1* | 1/2018 | Sella ................... G06F 11/1458 707/648 |
| 2019/0158512 A1* | 5/2019 | Zhang ................... G06F 21/566 |

OTHER PUBLICATIONS

Miller, "CS 537 Notes, Section #26: Windows (NT) File System," *Operating Systems Concepts*, Chapter 22, Section 22.5, 4 pages (2002).

DEW Associates Corporation, "NTFS Directories and Files," <http://www.dewassoc.com/kbase/windows_nt/ntfs_directories_and_files.htm>, 7 pages (2000).

Scaife, et al., "CryptoLock (and Drop It): Stopping Ransomware Attacks on User Data," 2016 IEEE 36th International Conference on Distributed Computing Systems (ICDCS), Nara, 2016, pp. 303-312.

DEW Assciates Corporation, NTFS Directories and Files, http://www.dewassoc.com/kbase/windows_nt/ntfs_directories_and_files.htm, 2000.

Miller, CS 537 Lecture Notes, Section 26, Windows (NT) File System, Chapter 22, Section 22.5 in Operating Systems Concepts, 2002.

Mathews, John M., Module for Monte Carlo Pi, http://mathfaculty.fullerton.edu/mathews//n2003/MonteCarloPiMod.html, 2003.

Lyda et al., Using Entropy Analysis to Find Encrypted and Packed Malware, Computer Science IEEE Security & Privacy, 2007.

Jung et al., Ransomware Detection Method Based on Context-Aware Entropy Analysis. Soft Computing 22, 6731-6740, 2018.

Christensen et al., Ransomware Detection and Mitigation Tool, Technical University of Denmark, Department of Applied Mathematics and Computer Science, 2017.

\* cited by examiner

Active User Directory Criteria: Identify directories that fall within a specified file path (e.g., C:\Users\Username\...)

| Directory path | Active User Directory? (Y/N) |
|---|---|
| C:\Program Files | N |
| C:\Users\Username\My Documents | Y |
| C:\Users\Username | Y |
| C:\temp | N |
| C:\Users\Username\My Pictures | Y |
| C:\Windows | N |

Directory 502
Directory 503
Directory 504
Directory 505
Directory 506
Directory 507

FIG. 5A

Active User Directory Criteria: Identify directories which include at least a certain number of files belonging to ransomware target file types (e.g., 500 files)

| Directory path | Number of files belonging to a ransomware target file type | Active User Directory? (Y/N) |
| --- | --- | --- |
| C:\Program Files | 1965 | Y |
| C:\Users\Username\My Documents | 543 | Y |
| C:\Users\Username | 28 | N |
| C:\temp | 26 | N |
| C:\Users\Username\My Pictures | 12 | N |
| C:\Windows | 0 | N |

Directory 502
Directory 503
Directory 504
Directory 505
Directory 506
Directory 507

FIG. 5B

Active User Directory Criteria: Rank directories by number of files belonging to ransomware target file types, and identify top percentage of directories (e.g., 50%)

| Directory path | Number of files belonging to a ransomware target file type | Active User Directory? (Y/N) |
|---|---|---|
| C:\Program Files | 1965 | Y |
| C:\Users\Username\My Documents | 543 | Y |
| C:\Users\Username | 28 | Y |
| C:\temp | 26 | N |
| C:\Users\Username\My Pictures | 12 | N |
| C:\Windows | 0 | N |

Directory 502
Directory 503
Directory 504
Directory 505
Directory 506
Directory 507

FIG. 5C

Active User Directory Criteria: Rank directories by number of files belonging to ransomware target file types, and identify top number of directories (e.g., 4)

| Directory path | Number of files belonging to a ransomware target file type | Active User Directory? (Y/N) |
| --- | --- | --- |
| C:\Program Files | 1965 | Y |
| C:\Users\Username\My Documents | 543 | Y |
| C:\Users\Username | 28 | Y |
| C:\temp | 26 | Y |
| C:\Users\Username\My Pictures | 12 | N |
| C:\Windows | 0 | N |

Directory 502
Directory 503
Directory 504
Directory 505
Directory 506
Directory 507

FIG. 5D

Active User Directory Criteria: Identify directories with a concentration of ransomware target file types greater than a certain threshold (e.g., 80%)

| Directory path | Number of files belonging to a ransomware target file type | Number of files not belonging to a ransomware target file type | Concentration of files belonging to a ransomware target file type | Active User Directory? (Y/N)? |
|---|---|---|---|---|
| Directory 502 — C:\Program Files | 1965 | 1249 | 61% | N |
| Directory 503 — C:\Users\Username\My Documents | 543 | 34 | 94% | Y |
| Directory 504 — C:\Users\Username | 28 | 6 | 82% | Y |
| Directory 505 — C:\temp | 26 | 39 | 40% | N |
| Directory 506 — C:\Users\Username\My Pictures | 12 | 0 | 100% | Y |
| Directory 507 — C:\Windows | 0 | 1782 | 0% | N |

FIG. 5E

Active User Directory Criteria: Rank directories by concentration of ransomware target file type, and identify top percentage of directories (e.g., 33%)

| Directory path | Number of files belonging to a ransomware target file type (410) | Number of files not belonging to a ransomware target file type (412) | Concentration of files belonging to a ransomware target file type (414) | Active User Directory? (Y/N) (416) |
|---|---|---|---|---|
| C:\Users\Username\My Pictures | 12 | 0 | 100% | Y |
| C:\Users\Username\My Documents | 543 | 34 | 94% | Y |
| C:\Users\Username | 28 | 6 | 82% | N |
| C:\Program Files | 1965 | 1249 | 61% | N |
| C:\temp | 26 | 39 | 40% | N |
| C:\Windows | 0 | 1782 | 0% | N |

Directory 506
Directory 503
Directory 504
Directory 502
Directory 505
Directory 507

FIG. 5F

Active User Directory Criteria: Rank directories by concentration of ransomware target file type, and identify top number of directories (e.g., 4)

| Directory path | Number of files belonging to a ransomware target file type (410) | Number of files not belonging to a ransomware target file type (412) | Concentration of files belonging to a ransomware target file type (414) | Active User Directory? (Y/N) (416) |
|---|---|---|---|---|
| Directory 506 — C:\Users\Username\My Pictures | 12 | 0 | 100% | Y |
| Directory 503 — C:\Users\Username\My Documents | 543 | 34 | 94% | Y |
| Directory 504 — C:\Users\Username | 28 | 6 | 82% | Y |
| Directory 502 — C:\Program Files | 1965 | 1249 | 61% | Y |
| Directory 505 — C:\temp | 26 | 39 | 40% | N |
| Directory 507 — C:\Windows | 0 | 1782 | 0% | N |

FIG. 5G

Active User Directory Criteria: Evaluate top-level directories using criteria taught in FIGS. 5A-5G

| Directory path | Number of files belonging to a ransomware target file type (410) | Number of files not belonging to a ransomware target file type (412) | |
|---|---|---|---|
| Directory 506 | C:\Users\Username\My Pictures | 12 | 0 |
| Directory 503 | C:\Users\Username\My Documents | 543 | 34 |
| Directory 504 | C:\Users\Username | 28 | 6 |
| Directory 502 | C:\Program Files | 1965 | 1249 |
| Directory 505 | C:\temp | 26 | 39 |
| Directory 507 | C:\Windows | 0 | 1782 |

Evaluate as one directory:(C:\Users) (508), with 583 files belonging to a ransomware target file type (i.e., 12 + 543 + 28), and with 40 files not belonging to a ransomware target file type (i.e., 0+34+6)

FIG. 5H

SYSTEMS AND METHODS FOR DETECTING RANSOMWARE INFECTION

RELATED APPLICATIONS

This application claims priority to U.S. Provisional Application No. 62/408,940 titled SYSTEMS AND METHODS FOR DETECTING RANSOMWARE INFECTION filed on Oct. 17, 2016, the entire contents of which are incorporated herein by reference.

FIELD OF THE INVENTION

The present innovations generally address methods and systems for detecting infection of computer files with malicious software, and more specifically, for detecting infection of computer files with ransomware.

BACKGROUND

Modern computer systems can be infected by malicious software (e.g., "malware"). To mitigate the effects of malicious software, computer systems, including servers, may be backed up to local or remote storage.

SUMMARY

The present disclosure is directed at systems and methods for detecting the presence of ransomware infection within a filesystem stored on a source volume. In some embodiments, the disclosed systems and methods analyze one or more image-based snapshots of a source volume, wherein the image-based snapshots capture the state of the source volume at a discrete moment in time. In other embodiments, the disclosed systems and methods analyze a live source volume whose contents are being dynamically changed even as the tests disclosed herein are being executed. In some embodiments, the disclosed systems and methods may enable a computer user to detect a ransomware infection within a filesystem before the ransomware announces itself by making a ransom demand, and/or before the ransomware has a chance to propagate further. Early detection of ransomware infection may be desirable because such detection may enable a user to take actions to mitigate the effects of ransomware. For instance, if the user detects ransomware infection within a filesystem early enough, the user may be able to restore a previous, uninfected backup of the filesystem before the uninfected backup ages out. Similarly, if the user detects ransomware infection before the ransomware has a chance to propagate throughout a filesystem, or from one filesystem to another filesystem, the user may take steps to isolate the infected files and prevent the ransomware from spreading.

In one aspect, the present disclosure is directed at a method for detecting ransomware infection in image-based backups of a filesystem. The method can comprise: identifying a plurality of ransomware target file types; providing a current Master File Table (MFT) representation associated with a current image-based backup of the filesystem; identifying a plurality of active user directories; determining a previous ransomware target file count from a number of files included in the previous image-based backup that belong to any of the plurality of ransomware target file types, and that are included within the plurality of active user directories; determining, using the current MFT representation, a current ransomware target file count from a number of files included in the current image-based backup that belong to any of the plurality of ransomware target file types, and that are included within the plurality of active user directories; and transmitting a signal indicating possible ransomware infection in the current image-based backup if the previous ransomware target file count is greater than a minimum use threshold and the current ransomware target file count is less than a ransomware detection threshold.

In some embodiments, the ransomware detection threshold can be equal to one.

In some embodiments, identifying the plurality of active user directories can comprise identifying directories that are included within a specified file path.

In some embodiments, identifying the plurality of active user directories can comprise identifying a directory as an active user directory based on a number of files included in the previous image-based backup that belong to any of the plurality of ransomware target file types.

In some embodiments, identifying the plurality of active user directories can comprise identifying a directory as an active user directory if a ratio of (i) a number of files stored within the directory that belongs to any of the plurality of ransomware target file types, and (ii) a total number of files stored within the directory exceeds a predetermined concentration threshold.

In some embodiments, the predetermined concentration threshold can be a number that is at least one of between 50% and 75%, between 75% and 90%, between 90% and 100%, and 100%.

In some embodiments, the method can further comprise extending an age-out period for image-based backups in response to transmitting the signal indicating possible ransomware infection.

In some embodiments, the method can further comprise designating the previous image-based backup as a protected backup in response to transmitting the signal indicating possible ransomware infection.

In some embodiments, the method can further comprise deleting the current image-based backup in response to transmitting the signal indicating possible ransomware infection.

In some embodiments, the method can further comprise isolating at least one subsection of the filesystem in response to transmitting the signal indicating possible ransomware infection.

In some embodiments, the method can further comprise, if the first ransomware target file count is less than or equal to the minimum use threshold, or if the second ransomware target file count is greater than the ransomware detection threshold: extracting a pre-determined number of files included in the current image-based backup, and that are included within the plurality of active user directories; calculating an entropy value associated with the randomly extracted files; and transmitting the signal indicating possible ransomware infection in the current image-based backup based on the entropy value.

In some embodiments, the pre-determined number of files is no more than twenty files.

In some embodiments, the method can further comprise concatenating contents of the randomly extracted files to form a concatenated file, wherein calculating the entropy value comprises calculating an entropy of the concatenated file.

In some embodiments, transmitting the signal indicating possible ransomware infection in the current image-based backup can comprise transmitting the signal if the entropy of the concatenated file falls within a ransomware detection range.

In some embodiments, calculating the entropy value comprises calculating an entropy for each randomly extracted file, and then averaging the calculated entropy for each randomly extracted file.

In another aspect, the present disclosure is directed at another method for detecting ransomware infection in image-based backups of a filesystem. The method can comprise: identifying a plurality of active user directories within a current image-based backup; extracting a number of files from within the plurality of active user directories; calculating an entropy value associated with the randomly extracted files; and transmitting a signal indicating possible ransomware infection in the current image-based backup based on the entropy value.

In another aspect, the present disclosure is directed at a system for detecting ransomware infection in image-based backups of a filesystem. The system can comprise: at least one memory storing a table including a current Master File Table (MFT) representation associated with a current image-based backup of the filesystem; at least one processor communicably coupled to the at least one memory, the at least one processor configured to execute a ransomware detection analytics component in order to: identify a plurality of ransomware target file types; identify a plurality of active user directories; determine a previous ransomware target file count from a number of files included in the previous image-based backup that belong to any of the plurality of ransomware target file types, and that are included within the plurality of active user directories; determine, using the current MFT representation, a current ransomware target file count from a number of files included in the current image-based backup that belong to any of the plurality of ransomware target file types, and that are included within the plurality of active user directories; and transmit a signal indicating possible ransomware infection in the current image-based backup if the previous ransomware target file count is greater than a minimum use threshold and the current ransomware target file count is less than a ransomware detection threshold.

In another aspect, the present disclosure is directed at another system for detecting ransomware infection in image-based backups of a filesystem. The system can comprise: at least one memory storing a table including a current image-based backup; at least one processor communicably coupled to the at least one memory, the at least one processor configured to execute a ransomware detection analytics component in order to: identify a plurality of active user directories within the current image-based backup; extract a number of files from within the plurality of active user directories; calculate an entropy value associated with the randomly extracted files; and transmit a signal indicating possible ransomware infection in the current image-based backup based on the entropy value.

In another aspect, the present disclosure is directed at non-transitory computer readable media storing instructions that, when executed by at least one processor, are operable to cause the at least one processor to: identify a plurality of ransomware target file types; provide a current Master File Table (MFT) representation associated with a current image-based backup of the filesystem; identify a plurality of active user directories; determine a previous ransomware target file count from a number of files included in the previous image-based backup that belong to any of the plurality of ransomware target file types, and that are included within the plurality of active user directories; determine, using the current MFT representation, a current ransomware target file count from a number of files included in the current image-based backup that belong to any of the plurality of ransomware target file types, and that are included within the plurality of active user directories; and transmit a signal indicating possible ransomware infection in the current image-based backup if the previous ransomware target file count is greater than a minimum use threshold and the current ransomware target file count is less than a ransomware detection threshold.

In another aspect, the present disclosure is directed at non-transitory computer readable media storing other instructions that, when executed by at least one processor, are operable to cause the at least one processor to: identify a plurality of active user directories within a current image-based backup; extract a number of files from within the plurality of active user directories; calculate an entropy value associated with the randomly extracted files; and transmit a signal indicating possible ransomware infection in the current image-based backup based on the entropy value.

BRIEF DESCRIPTION OF THE DRAWINGS

For a more complete understanding of the present disclosure, reference is now made to the following descriptions taken in conjunction with the accompanying drawings, in which:

FIGS. 5A, 5B, 5C, 5D, 5E, 5F, 5G, and 5H depict illustrative examples demonstrating different ways to identify active user directories, according to some embodiments.

DETAILED DESCRIPTION

Figure 1:
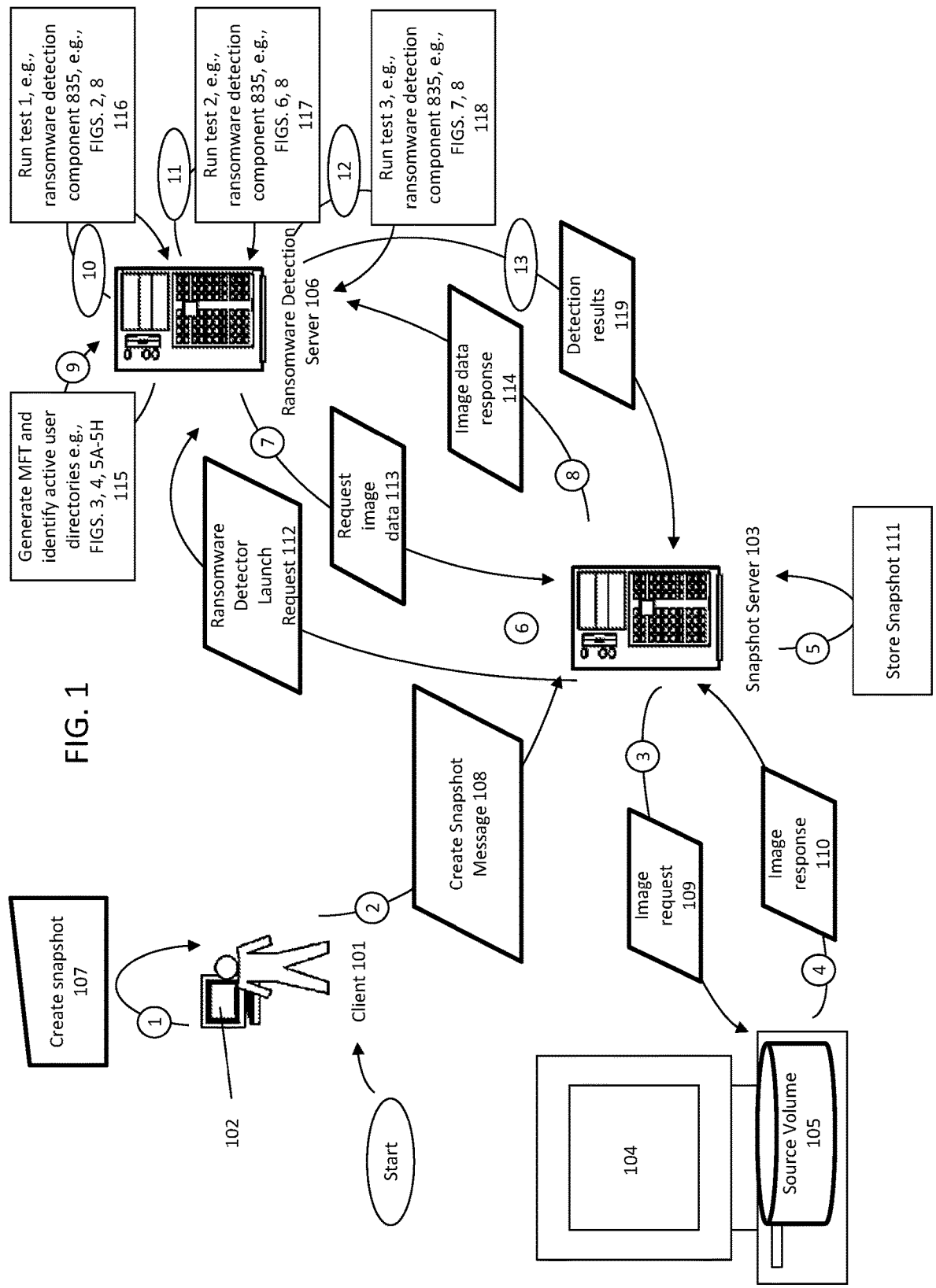
FIG. 1 is an example data flow illustrating aspects of a ransomware detection system, according to some embodiments.

Ransomware is a type of computer malware that installs covertly on a victim's computer, disables the user's access to the computer's files, and then demands a ransom payment in order to restore the user's access. Some types of ransomware may covertly encrypt the computer's files with a secret key, and then demand a ransom payment in order to decrypt the files. This ransom demand may be presented to the user via a pop-up message or dialog box that informs the user his or her files have been infected with ransomware, and that the user may only restore access to the files by paying a specified amount of money to a certain online location.

Since decrypting the encrypted computer files without the secret key may be difficult, expensive, and/or time-consuming for most users, many users may elect to pay the ransom payment in order to restore access. Notable examples of ransomware include CryptoLocker, Reveton, TorrentLocker, and CryptoWall.

Some computer users attempt to mitigate the consequences of malware infection (including ransomware) by periodically backing up the contents of their filesystems according to a regular schedule. If all or part of a filesystem is corrupted, encrypted, or infected by malware (such as ransomware), a user may restore a previous backup of the filesystem. While the user would lose all changes made to the filesystem since the previous backup, this is generally preferable to losing all or most of the files stored on the filesystem.

However, computers that periodically backup the contents of filesystems generally make space in memory for new backups by deleting older backup versions. For example, computers may delete one or more of the oldest, previously stored backup versions in order to make space for new backup versions. This process of deleting the oldest, previously stored backup versions may be referred to as "aging out" older backup versions. Knowing this, some types of ransomware will not announce its presence in a filesystem (e.g., by demanding the ransom payment) until a certain period of time (e.g., one week) has passed since the initial infection. This waiting period may ensure that all uninfected backup versions of a filesystem will have aged out before the user realizes that his or her files are infected.

Some types of ransomware may also take a significant amount of time to propagate throughout a filesystem. By not announcing its presence in a filesystem for a certain period of time, the ransomware can ensure that all or most of a filesystem is infected before the user becomes aware of the problem.

In some embodiments, a ransomware detection method being implemented by a ransomware detection server analyzes a frozen, image-based snapshot of a source volume that captures the state of the source volume at a discrete moment in time in order to detect whether or not the source volume has been infected with ransomware. In other embodiments, a ransomware detection method may be used to analyze a live source volume whose contents are dynamically changing as an operating system performs reads or writes to the source volume in order to detect whether the source volume has been infected with ransomware.

FIG. 1 shows an example data flow illustrating aspects of a ransomware detection system, according to some embodiments. In one implementation of the ransomware detection system, client 101 can use a client device 102 to issue a create snapshot command 107. The create snapshot command 107 causes the client device 102 to send a create snapshot message 108 to a snapshot server 103. The create snapshot command 108 can cause the snapshot server 103 to issue an image request message 109 to a computer 104 having a source volume 105. In response to the image request message 109, computer 104 can then generate a snapshot image of the current state of source volume 105. The snapshot image can be, for example, a Virtual Hard Disk (VHD), a Virtual Machine Disk (VMDK), an ISO file representing a virtual hard drive file, or in general a raw file and/or the like files. A raw file can be a file containing a block-for-block copy that can be either a block-by-block representation of a device from which the raw file was derived or a sparse file wherein the raw file can exclude redundant block segments, such as empty or unallocated blocks in the device from which the raw file was derived.

Once the snapshot image has been generated, computer 104 can send an image response 110 back to snapshot server 103. The image response 110 can comprise the generated snapshot image. An example image response message 110, substantially in the form of an HTTP(S) POST message including XML-formatted data, is provided below:

```
POST /os_image_response.php HTTP/1.1
Host: www.osimagevirtualizationserver.com
Content-Type: Application/XML
Content-Length: 667
<?XML version=" 1.0" encoding="UTF-8"?>
<image_response>
    <timestamp>2020-12-12 15:22:43</timestamp>
    <credentials>
        <password>secretpass 1234</password>
        <crypto_key>h767kwjiwnfe456#@hnniimidrtsxbi
            </crypto_key>
    </credentials>
<image type="base">
    <image_location type="local_file"
    version="9 .O"
    number_ variants="8"
    path="/var/images/current snapshot.vmdk">
</image>
</image_response>
```

In one embodiment, the snapshot server 103 can then store the received source volume snapshot 111. In some embodiments, snapshot server 103 can keep track of incremental source volume snapshots to maintain a history of changes that have occurred within source volume 105. Upon receiving the source volume snapshot, snapshot server 103 can send a ransomware detector launch request 112 to a ransomware detection server 106. Ransomware detection server 106 can respond to the launch request 112 by sending a request image data 113 request to the snapshot server 103, which requests snapshot image data associated with source volume 105. The snapshot server 103 can respond by sending an image data response 114 back to the ransomware detection server 106. In some embodiments, the image data response 114 can include all or part of the latest snapshot image of source volume 105. In some embodiments, the image data response 114 can include data derived from or based on the latest snapshot image of source volume 105, either in addition to or in place of all or part of the latest snapshot image. The image data response 114 can also include all or part of a previous snapshot image (e.g., a snapshot taken earlier in time than the latest snapshot image) of source volume 105, and/or data derived from or based on the previous snapshot image of source volume 105.

Upon receiving the image data response 114, ransomware detection server 106 can, in some embodiments, prepare to run one or more tests on the received image data response 114 to detect whether files on the source volume 105 have been infected with ransomware. For example, ransomware detection server 106 can generate, copy, and/or extract one or more Master File Tables (MFTs), one or more portions of one or more MFTs, or data derived from, based on, or summarizing one or more MFTs, from the received image data, and can also identify active user directories within the received image data (115). The process for generating and/or extracting MFTs and identifying active user directories is described in greater detail below in relation to FIGS. 3, 4, and 5A-5H. Once these preparations are done, ransomware detection server 106 can implement one or more tests on the received image data, including test 1 (step 116, described in greater detail below in relation to FIG. 2), test 2 (step 117, described in greater detail below in relation to FIG. 6), and/or test 3 (step 118, described in greater detail below in relation to FIG. 7). These tests may be executed in any order and in any combination. Based on the results of the test(s), ransomware detection server 106 transmits detection results 119 back to snapshot server 103. Detection results 119 can include an indication of whether or not the source volume 105 has been infected with ransomware.

Based on the detection results 119 received from ransomware detection server 106, snapshot server 103, computer 104, client device 102, and/or client 101 can take certain actions. For example, snapshot server 103 and/or computer 104 may transmit a signal to client device 102 to let the client know that ransomware infection has been detected in source volume 105. In some embodiments, snapshot server 103 can automatically delete previous-stored snapshots after a certain amount of time or after a certain number of snapshots have been taken—this is known as "aging out" old snapshots, and can be used to free up space for new snapshots. In such embodiments, if detection results 119 indicate that ransomware infection has been detected, snapshot server 103 can suspend or modify this procedure for aging out old snapshots. For example, snapshot server 103 can stop "aging out" or deleting old snapshots entirely until instructed otherwise. Alternatively, snapshot server 103 can extend the age-out period so that old snapshots are held in memory for a longer period of time than they would have been if no ransomware infection had been detected. In some embodiments, snapshot server 103 can designate a previous snapshot for which no ransomware infection was found as a "protected snapshot," so that the protected snapshot will not be automatically deleted as part of the age-out process until instructed otherwise. In some embodiments, snapshot server can delete a current snapshot which has been found to be infected with ransomware. In yet other embodiments, snapshot server 103 and/or computer 104 can isolate at least one subsection of a filesystem stored on source volume 105 so as to prevent the detected ransomware infection from spreading to other files. This isolation can comprise suspending computer 104 and/or source volume 105's access to other filesystems (e.g., network access). Any or all of these actions may be based on, or initiated, managed, terminated, or calibrated by signals transmitted from one device to another (e.g., from ransomware detection server 106 to snapshot server 103) or by signals transmitted within a device (e.g., from one internal component of a device to another internal component of the same device).

FIG. 1 describes a ransomware detection system that analyzes one or more frozen, image-based snapshots of a source volume, wherein the snapshots capture the state of the source volume at a discrete moment in time, in order to detect whether or not the source volume has been infected with ransomware. However, other embodiments are also possible. For example, some embodiments of the ransomware detection systems and methods described herein can analyze the changing contents of a source volume that is currently mounted, and to which an operating system is performing active reads or writes even as the tests described below are being executed. In such embodiments, ransomware detection server 106 may be communicably coupled with computer 104 having source volume 105, either directly or by way of one or more intervening components. Ransomware detection server 106 may perform one or more of the tests for ransomware described herein on the source volume 105 even as its contents are dynamically changed by computer 104. In some embodiments, all or parts of the tests described herein may be implemented directly by the computer 104 instead of by ransomware detection server 106.

In certain preferred embodiments, the systems and methods discussed herein for detecting ransomware infection within a filesystem can analyze a Master File Table (MFT), portions of a MFT, or data derived from, based on, or summarizing a MFT, associated with the filesystem instead of the filesystem directly. A MFT is a file structure generally found on filesystems, such as NTFS and FAT filesystems, which includes metadata describing all the files and directories stored within the filesystem. For example, the MFT can contain an entry storing metadata for each file or directory within the filesystem, such as each file/directory's name, creation date and time, security settings (e.g., user read/write permissions), and last modified date and time. In addition to metadata, the MFT can also, in some circumstances, include the actual contents of smaller files and directories stored within the filesystem. For larger files and/or directories, however, the MFT does not include the data contents, but instead stores pointers to logical clusters outside of the MFT that contain the data contents. Since the MFT does not contain the full contents of larger files and/or directories, the MFT can be many times smaller in size than its associated filesystem. For instance, a filesystem containing multiple Gigabytes or Terabytes of data may have a MFT that is only several hundred megabytes in size. Although defragmenting and extracting the MFT from a filesystem can require some investment of time and computational resources, analyzing a filesystem's MFT instead of the entire filesystem to detect ransomware infection can be done faster, more efficiently, and with less computational resources overall than other systems or methods that analyze the entire filesystem. Furthermore, for embodiments that analyze frozen snapshot images of a source volume, analyzing the filesystem's MFT instead of the entire filesystem can result in further computational savings. For example, analyzing the contents of a filesystem may require mounting the source volume snapshot image on which the filesystem is stored; however, analyzing the MFT may be done without mounting the source volume snapshot. Therefore, for embodiments that analyze snapshot images of source volumes, analyzing the MFT instead of the actual contents of a filesystem may save the time and computational resources required to mount the snapshot images. However, the tests for ransomware described herein may also be performed on a mounted source volume whose contents are dynamically changing, and not only on frozen snapshot images.

Figure 2:
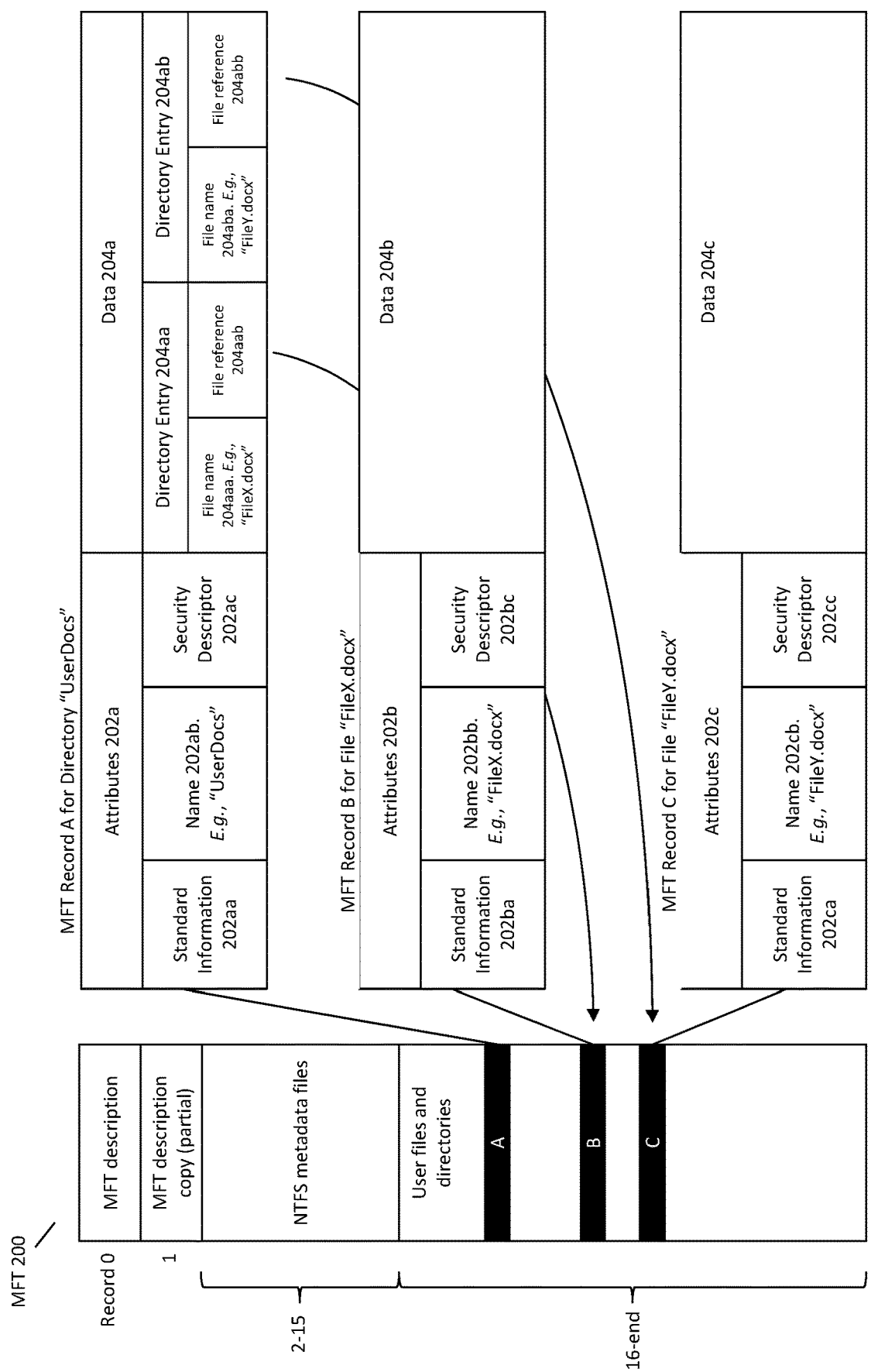
FIG. 2 is a logical block diagram of an exemplary Master File Table (MFT), according to some embodiments.

FIG. 2 is a logical block diagram of an exemplary MFT 200, according to some embodiments. The MFT 200 comprises a number of sequentially numbered records. The first sixteen records (i.e., records 0 through 15) comprise data used by the filesystem to store its metadata and to implement the filesystem. The first record of the MFT (Record 0) is typically found at or near the beginning of a volume within which the MFT 200 is stored and includes data describing the MFT itself. Record 1 is a partial copy of the data found within record 0. If the data in the first MFT record is corrupted, the filesystem (e.g., NTFS) reads the second record to find the MFT mirror file. Records 2 through 15 include further metadata needed for proper operation of the filesystem.

Records 16 and onwards contain entries for user files and directories stored within the filesystem. Each user file and each directory within the filesystem includes one entry in the MFT. For purposes of illustration, three entries (A, B, and C) have been expanded to show the structure of individual entries. MFT Record A describes a directory named "User- Docs," and comprises two separate sections: an attributes section 202*a*, and a data section 204*a*. Attributes section 202*a* can be further subdivided into at least three sub-sections: standard information sub-section 202*aa*, name sub-section 202*ab*, and security descriptor sub-section 202*ac*. Standard information sub-section 202*aa* includes information that was standard in MS-DOS, such as read/write permissions, creation time, last modification time, and a count of how many directories point to this MFT entry. Name sub-section 202*ab* includes the name of the file or directory to which the MFT entry pertains—in this case, the name 202*ab* sub-section is populated with the name "User-Docs", since MFT Record A pertains to a directory named "UserDocs". Security descriptor sub-section 202*ac* includes security and access-related attributes such as which user owns the file or directory, which users may access this file or directory, and how they may access it.

The data section 204*a* includes a directory entry for every file or directory found within the directory "UserDocs." In the example depicted in FIG. 2, "UserDocs" contains two files: a first file named "FileX.docx", and a second file named "FileY.docx." Each file is allocated its own directory entry: directory entry 204*aa* pertains to "FileX.docx", and directory entry 204*ab* pertains to "FileY.docx." Each directory entry 204*aa* and 204*ab* contains two fields: a file name field and a file reference field. For example, directory entry 204*aa* contains a file name field 204*aaa* that specifies the name of the file to which directory entry 204*aa* pertains, i.e., "FileX.docx." Directory entry 204*aa* also contains a file reference field 204*aab* that contains a pointer to the location of the MFT record pertaining to "FileX.docx," i.e., MFT Record B, described in greater detail below. Similarly, directory entry 204*ab* contains a file name field 204*aba* that specifies the name of the file to which directory entry 204*ab* pertains, i.e., "FileY.docx." Directory entry 204*ab* also contains a file reference field 204*abb* that contains a pointer to the location of the MFT record pertaining to "FileY.docx," i.e., MFT Record C, described in greater detail below.

For simplicity, data section 204*a* is shown to include a separate directory entry for every file or directory located within the directory "UserDocs," and indeed this is generally the case for directories containing a relatively small number of files or sub-directories. However, for directories containing a large number of files or sub-directories, data section 204*a* may not be large enough to contain a separate directory entry for every file or sub-directory. In such cases, data section 204*a* may instead contain an index root for a B+ tree. The index root can contain pointers to additional nodes of the B+ tree, which are stored in disk clusters external to MFT Record A. These additional nodes may themselves contain additional pointers to further nodes. The B+ tree can continue to branch into additional nodes in this fashion until it terminates in leaves that contain file names and file references, such as file names 204*aaa* 204*aab*. Therefore, to access the full list of files stored within a large directory, it may be necessary to iterate the full extent of the B+ tree pointed to by the index root stored at data section 204*a*.

MFT Record B, which is another entry in the MFT 200, is associated with the file "FileX.docx." Similar to MFT Record A, MFT Record B is also subdivided into two separate sections: an attributes section 202*b* and a data section 204*b*. Attributes section 202*b* also contains three sub-sections: standard information sub-section 202*ba*, name sub-section 202*bb* (which contains the name of the file to which MFT Record B pertains, i.e., "FileX.docx"), and security descriptor sub-section 202*bc*. These sub-sections 202*ba*, 202*bb*, and 202*bc* are substantially similar to the sub-sections 202*aa*, 202*ab*, and 202*ac* described above in relation to MFT Record A. MFT Record B also contains a data section 204*b*. For small files, data section 204*b* can contain all of the data that constitutes the contents of "FileX.docx." For larger files, however, the contents of the file may not fit within the data section 204*b*. In these cases, data section 204*b* can contain pointers to sequences of logical clusters external to MFT Record B. These sequences of logical clusters can contain the contents of "FileX.docx."

MFT Record C, which is another entry in the MFT 200, is associated with the file "FileY.docx." Similar to MFT Record B, MFT Record C is also subdivided into an attributes section 202*c* and a data section 204*c*. Attributes section 202*c* also contains three sub-sections: standard information sub-section 202*ca*, name sub-section 202*cb*, and security descriptor sub-section 202*cc*. These sub-sections 202*ca*, 202*cb*, and 202*cc* are substantially similar to the sub-sections 202*aa*, 202*ab*, 202*ac*, and 202*ba*, 202*bb*, and 202*bc* described above in relation to MFT Records A and B. MFT Record C also contains a data section 204*c*. Just as with MFT Record B, data section 204*c* of MFT Record C can contain all of the data that constitutes the contents of "FileY.docx." For larger files, however, the contents of the file may not fit within data section 204*c*. In these cases, data section 204*c* can contain pointers to sequences of logical clusters external to MFT Record C. These sequences of logical clusters can contain the contents of "FileY.docx."

Figure 3:
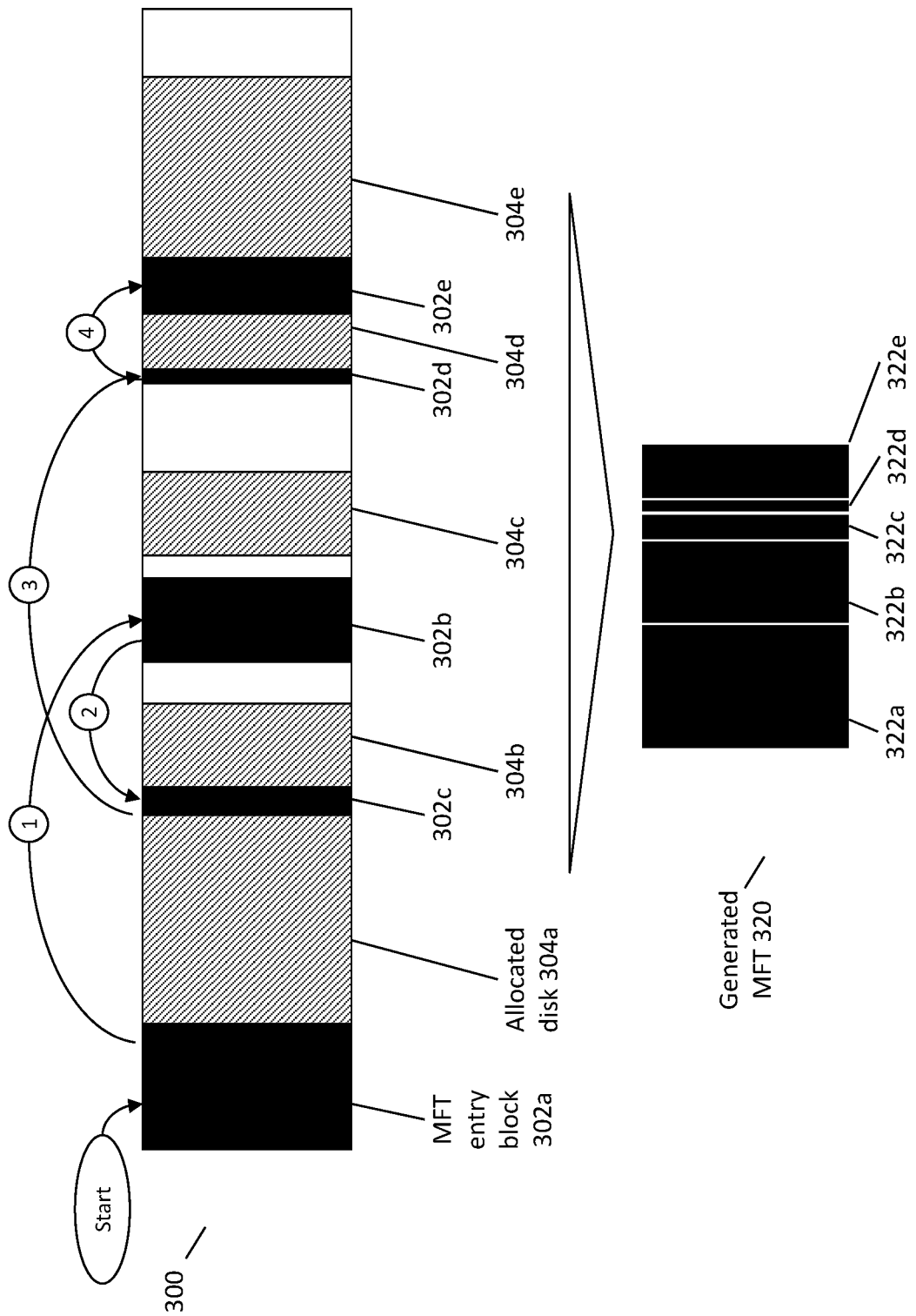
FIG. 3 is a logical block diagram depicting how a MFT may be scattered across multiple non-contiguous and non-consecutive clusters of a disk, according to some embodiments.

Often, the records of a MFT for a filesystem, such as MFT 200, may be scattered across several, non-contiguous (and, in some cases, non-consecutive) clusters of a disk. In these cases, assembling the records of the MFT may require iterating through all the different clusters on which the MFT is stored. FIG. 3 is a logical block diagram depicting how a MFT may be scattered across multiple non-contiguous and non-consecutive clusters of a disk 300. Disk 300 comprises a plurality of consecutively numbered logical clusters, proceeding from left to right. Clusters colored solid black indicate blocks of clusters storing MFT entries, such as MFT entry block 302*a*, 302*b*, 302*c*, 302*d*, and 302*e*. Clusters filled with a hatched pattern indicate blocks of clusters allocated to storing contents of a filesystem on disk 300, while clusters not filled with any pattern (i.e., colored white) indicate blocks of clusters that have not yet been allocated to storing any data. The first MFT entry block (e.g., MFT entry block 302*a*) is generally stored at or near the beginning of disk 300 (e.g., to the far left of disk 300, according to the logical block diagram in FIG. 3). As illustrated, the MFT blocks may be scattered across non-contiguous clusters on disk 300. The MFT blocks may also be non-consecutive in that later clusters in disk 300 may store MFT blocks that come earlier (in the assembled MFT) than MFT blocks stored in earlier clusters—for instance, MFT block 302*b*, which precedes MFT block 302*c* in the MFT, is nevertheless stored further along disk 300 than MFT block 302*c*. In order to assemble the MFT stored on disk 300, a user or program must generally defragment the MFT by iterating through each MFT entry block, starting with entry block 302*a* at the beginning of disk 300. Each MFT entry block will contain a pointer to the next MFT entry block in line, which allows the program to jump to the beginning of the next MFT block on disk 300. In this way, the program can jump from MFT block 302*a* to 302*b*, then to 302*c*, 302*d*, and 302*e*, in that order. After iterating through all the MFT blocks 302*a-e*, a MFT 320 can be generated. MFT 320 can, in some embodiments, comprise a complete block-for-block copy of the contents of MFT blocks 302*a-e* organized into one contiguous, consecutively numbered table. In other embodiments, MFT 320 may comprise only a portion of the MFT blocks 302a-e, and may omit certain MFT records, or portions of MFT records. MFT 320 can also comprise data derived from, based on, or summarizing MFT blocks 302a-e. In some embodiments, MFT 320 may be stored not on disk 300, but in a separate, working memory.

Some of the tests for detecting ransomware disclosed herein are generally described as including steps that operate on (e.g., provide, compute, generate, analyze, or edit), the "MFT" associated with the source volume. However, it should be understood that multiple ways of operating on the "MFT" associated with the source volume are possible. In some embodiments, the steps described herein may operate directly on MFT blocks 302a-e stored on MFT 320. In other embodiments, the steps described herein may operate on MFT 320, which as described above, may be (i) a complete block-for-block copy of MFT blocks 302a-e, (ii) a copy of only a portion of MFT blocks 302a-e, and/or (iii) data derived from, based on, or summarizing MFT blocks 302a-e. Also as described above, MFT 320 may be stored in a separate working memory than disk 300. For ease of explication, these distinctions are not treated separately in the description below, which generally refers only to operating on the "MFT" associated with the source volume. However, unless expressly indicated otherwise, it should be understood that general descriptions of operating on (e.g., providing, computing, generating, analyzing, and/or editing) the "MFT" associated with the source volume encompasses any of the foregoing possibilities.

Figure 4:
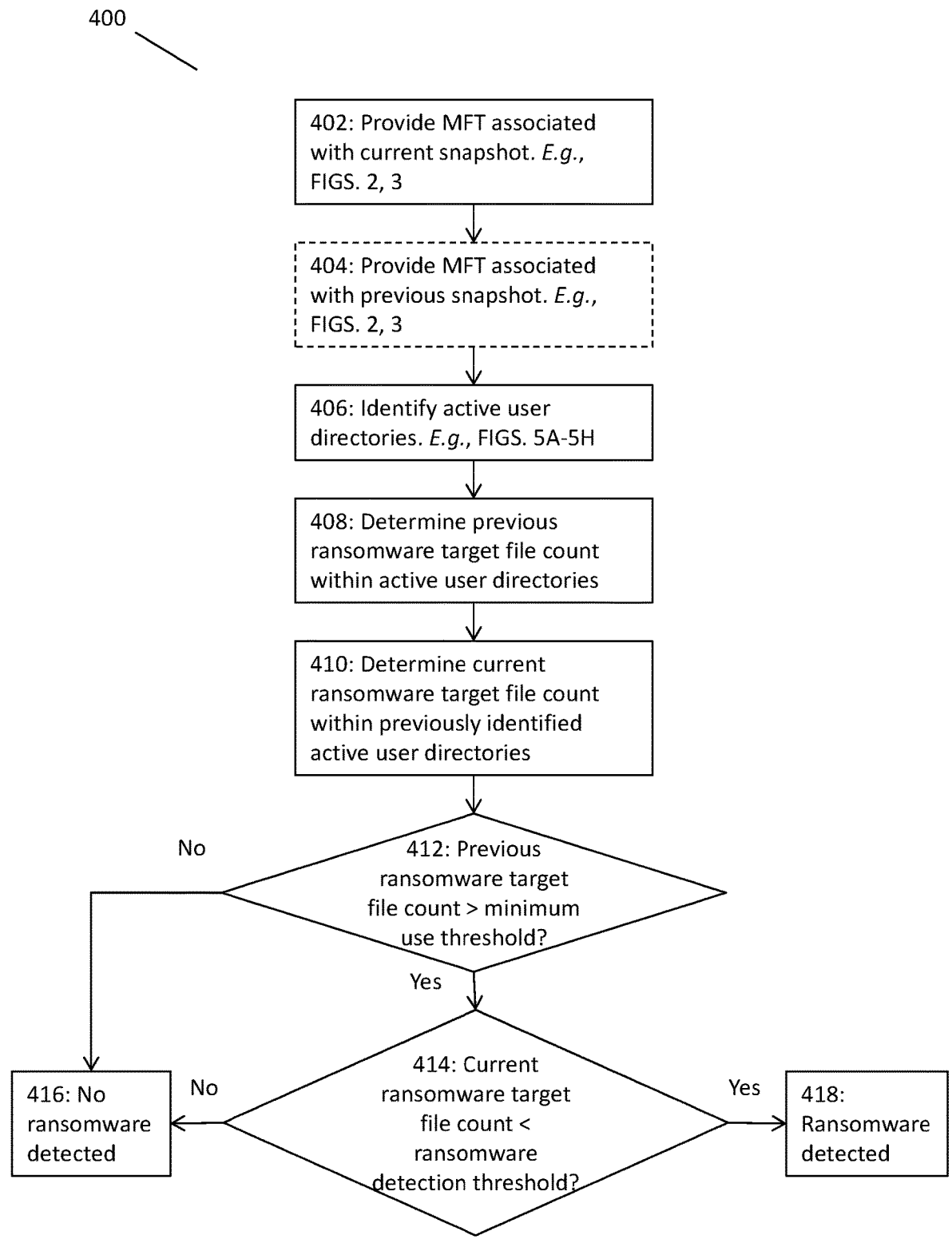
FIG. 4 is a flowchart depicting an exemplary process for implementing a first type of test for detecting ransomware, according to some embodiments.

FIG. 4 is a flowchart depicting an exemplary process 400 for implementing a first type of test for detecting ransomware, according to some embodiments. This first type of test can correspond to dataflow 116 depicted in FIG. 1. Although dataflow 116 is illustrated in association with ransomware detection server 106 in FIG. 1, any part of process 400 can be implemented by any or any combination of client device 102, computer 104, snapshot server 103, and ransomware detection server 106. At a high level, process 400 exploits two features of ransomware to detect ransomware infection on a filesystem: (i) ransomware tends to target only specific file types within certain filesystem directories for infection, while leaving other types of file and/or other directories unaffected, and (ii) ransomware tends to change the file types of infected files (e.g., change the file extension of a ".DOCX" file to ".DOCX.GOTCHA" or to some other file type extension).

Regarding the first feature, ransomware tends to target files stored within directories that are actively managed or edited by one or more users as part of the users' everyday operation of computer 104. These directories, referred to as "active user directories" herein, may contain documents that are valuable to a user, such as spreadsheets or word documents containing business or personal records, drafts of important documents, or media files such as pictures or movie files. Files within active user directories may be targeted by ransomware for infection because users are more likely to pay money to recover these files. By contrast, active user directories tend not to include directories storing files that may be important for the smooth operation of computer 104, but which the user does not directly manage or edit as part of his or her everyday use of computer 104. For instance, directories containing windows library files (e.g., .DLL files) or executable program files (e.g., .EXE files) are generally not considered active user directories. Windows library files are generally not targeted for infection by ransomware because, unlike other types of malware, the objective of ransomware is not to cripple the computer 104.

Crippling the computer 104 may be counterproductive to the ransomware's ultimate goal of obtaining a ransom because doing so may prevent the user from paying the ransom. Instead, the objective of ransomware is to prevent the user from accessing his or her user files until the user pays a ransom, after which the encrypted hostage files are unencrypted and access is returned to the user.

Ransomware also tends to target files that belong to specific file types, referred to herein as "ransomware target file types." Ransomware target file types include file types such as .DOCX, .XLSX, .PPTX, or .PDF files. These files may be targeted by ransomware for infection because they are generally files actively managed or edited by users as part of their everyday use of computer 104, and because they represent the type of files that a user may be willing to pay money in order to recover. By contrast, Windows library file types (e.g., .DLL files) or executable program files (e.g., .EXE) are generally not considered ransomware target file types because these are not files actively edited by users, but are files that can come pre-installed with computer 104's operating system. Ransomware generally does not target such files for infection because encrypting such files may cripple the operating system of computer 104, which may prevent the user of computer 104 from paying the ransom. As described in further detail below, by limiting analysis of an examined filesystem to only active user directories and files belonging to ransomware target file types, process 400 can both decrease the time and computational resources required to inspect a filesystem, as well as increase the likelihood of detecting a ransomware infection.

Regarding the second feature, ransomware tends to change the file type extensions of infected files. For example, some common types of ransomware may append a suffix (e.g., ".GOTCHA") to the end of the file names of infected files. Therefore, an infected Word document's file type suffix may change from ".DOCX" to ".DOCX.GOTCHA." Other types of ransomware may change all or part of an infected files' file name into a random string, with no recognizable file type extension at the end. These types of ransomware change the file type extension of infected files to make it even more difficult for users to recover their files without paying the demanded ransom—not only must the user decipher the encrypted contents of infected files, the user must also reverse the effects of the ransomware's renaming of hundreds or thousands of personal files. In some cases, the user must also deduce the identity and file type of each infected file. Therefore, if source volume 105 used to contain a large number of files with file extension suffixes belonging to a ransomware target file type, but now contains only a very small number (or even zero) files with file extension suffixes belonging to a ransomware target file type, this may be an indication that source volume 105 has been infected with ransomware.

Turning now to the details of process 400, at step 402, an MFT associated with a current snapshot of source volume 105 is provided. This step can be implemented as part of dataflow 115 in FIG. 1, and can be done by iterating through the MFT entry blocks of the current snapshot of source volume 105 as illustrated in FIG. 3. Alternatively, if the MFT of the current snapshot has been recently computed, that previously computed MFT may be retrieved and re-used to save computational effort.

At step 404, an MFT associated with a previous snapshot of source volume 105 is provided. This step can also be implemented as part of dataflow 115 in FIG. 1, and can be done by iterating through the MFT entry blocks of a previous snapshot of source volume 105 stored on snapshot server 103. Alternatively, if the MFT of the previous snapshot has been recently computed, that previously computed MFT may be retrieved and re-used to save computational effort.

At step 406, process 400 can identify active user directories by analyzing the MFT associated with the previous snapshot of source volume 105 provided at step 404. As discussed above, active user directories can be directories that are likely to contain files that are actively managed or edited by one or more users as part of the users' everyday operation of computer 104. Such active user directories may be targeted by ransomware for infection because they generally contain files that a user would be willing to pay money to recover. Different ways of identifying active user directories are described in greater detail below in relation to FIGS. 5A-5H.

At step 408, process 400 can determine a previous ransomware target file count within the active user directories identified in step 406. A previous ransomware target file count can refer to a count of the number of files belonging to a ransomware target file type that were stored in the previous snapshot of source volume 105. Since the MFT associated with the previous snapshot contains metadata describing, among other things, the filenames (including the file extensions) and directory locations of all files that were previously part of the filesystem, process 400 can determine the previous ransomware target file count solely by examining the MFT associated with the previous snapshot. By examining the MFT of the previous snapshot only, process 400 can determine the previous ransomware target file count without analyzing the entire contents of the previous snapshot. As described above, this can result in significant savings of time and computational resources.

At step 410, process 400 can determine a current ransomware target file count within the active user directories identified in step 406. This process can be substantially similar as that described above for step 408, except that instead of analyzing the MFT associated with the previous snapshot, process 400 can analyze the MFT associated with the current snapshot instead. In this way, process 400 can determine the number of files belonging to a ransomware target file type currently still stored in an active user directory.

At step 412, process 400 can compare the previous ransomware target file count (determined in step 408) against a minimum use threshold. If the previous ransomware target file count is less than or equal to the minimum use threshold, process 400 branches to step 416, which indicates that no ransomware has been detected. If the previous ransomware target file count is greater than the minimum use threshold, process 400 branches to step 414.

At step 414, process 400 can compare the current ransomware target file count against a ransomware detection threshold. If the current ransomware target file count is less than the ransomware detection threshold, process 400 can branch to step 418, at which process 400 indicates that ransomware infection has been detected in the current snapshot. If the current ransomware target file count is greater than or equal to the ransomware detection threshold, process 400 can branch to step 416, which indicates that no ransomware has been detected.

Steps 412 and 414 in process 400 exploit the fact that if ransomware has indeed infected source volume 105, the ransomware will generally change the file types (e.g., by changing the file type extension in the file name) of all or most of the files belonging to a ransomware target file type within all active user directories. Therefore, if process 400 detects that a source volume 105 used to contain a significant number of files belonging to a ransomware target file type within its active user directories, but in the very next snapshot contains no such files at all (or very few such files), this may be an indication that source volume 105 has been infected with ransomware.

The filter for previous ransomware target file count in step 412 can reduce false positives, e.g., instances where process 400 indicates a ransomware infection when there is in fact no infection. In very new or recently reformatted computers, the current ransomware target file count determined in step 410 may be very low. This is not necessarily a sign that the new or recently reformatted computer has been infected with ransomware—it may merely mean that the user has not yet had a chance to add user files to the computer. By ensuring that the previous ransomware target file count is greater than a minimum use threshold in step 412, process 400 ensures that this edge case does not cause process 400 to show false positives. In other words, although new or recently reformatted computers may have current ransomware target file counts that are less than the ransomware detection threshold, these new or recently reformatted computers will also be expected to have a previous ransomware target file count that is less than the minimum use threshold. In such cases, step 412 causes process 400 to branch to step 416, which indicates that no ransomware is detected.

The minimum use threshold and the ransomware detection threshold in process 400 can be adjustable parameters that can be changed by a system administrator. Depending on how these parameters are set, the system administrator can balance the sensitivity of process 400. By decreasing the minimum use threshold and increasing the ransomware detection threshold, the system administrator may make the process 400 more likely to detect ransomware detection, at the cost of increasing the rate of false positives. Conversely, by increasing the minimum use threshold and decreasing the ransomware detection threshold, the system administrator may decrease the rate of false positives, but may increase the rate of false negatives, e.g., make the process 400 report that no ransomware has been detected when an infection in fact exists. In some exemplary embodiments, the minimum use threshold may be set at 20, while the ransomware detection threshold may be set at 0. Other minimum use thresholds include numbers between 10 and 20, between 20 and 30, and between 30 and 50. Other example ransomware detection thresholds include numbers between 0 and 5, between 5 and 10, between 10 and 20, and larger numbers as well. These values may strike an appropriate balance between false negatives and false positives.

Process 400 can also be modified by adding, deleting, modifying, or rearranging the order of one or more steps. For example, steps 408 and 412 may be performed earlier in process 400 such that if the previous ransomware target file count is less than the minimum use threshold, some or all of the other steps are not performed. This can save unnecessary computational effort. In some embodiments, steps 408 and 412 may be omitted entirely in processes that do not evaluate the previous ransomware target file count. This can also save unnecessary computational effort in situations where there are unlikely to be many new or recently reformatted computers being examined, or where the user has decided to not account for such computers.

Process 400 can also be modified by omitting step 404, as indicated by the dashed outline of step 404. In some cases, MFT entries that have been marked for deletion may take some time to be actually purged from the MFT. As a result, process 400 can sometimes deduce recent changes (e.g., deletion, re-organization, or renaming of files) to source volume 105 by examining MFT entries in the current snapshot of source volume 105 that have been marked for deletion but that have not yet been actually purged. In this way, process 400 can deduce at least part of the contents and organization of source volume 105 shortly before the current snapshot was taken. Process 400 can therefore be modified by omitting step 404 (which provides the MFT associated with the previous snapshot). Instead, process 400 can use data gleaned from recently deleted MFT entries that have not yet been purged to identify active user directories in step 406, and to determine the previous ransomware target file count in step 408. Since extracting an MFT from a snapshot can require significant time and computational resources (as illustrated and explained in relation to FIG. 3), these embodiments can save significant computational effort, since it will now only be necessary to extract an MFT from one snapshot (the current snapshot) instead of two (the current and the previous snapshot).

FIGS. 5A-5H use illustrative examples to demonstrate different ways to identify active user directories, according to some embodiments. FIG. 5A illustrates a first way to identify active user directories by identifying only directories that fall within a specified file path. This method for identifying active user directories exploits the fact that users tend to store their user files within predictable locations on most computers, such as all directories contained within the C:\Users\Username\ path. FIG. 5A illustrates an exemplary filesystem that includes six directories: directory 502 (C:\Program Files), directory 503 (C:\Users\Username\My Documents), directory 504 (C:\Users\Username), directory 505 (C:\temp), directory 506 (C:\Users\Username\My Pictures), and directory 507 (C:\windows). Directories 503, 504 and 506 fall within the specified file path (C:\Users\Username) and so are identified as active user directories. By contrast, since directories 502, 505, and 507 do not fall within the specified file path, they are not identified as active user directories. Of course, the specified file path C:\Users\Username is an example only, and any appropriate file path may be used.

FIG. 5B illustrates a second way to identify active user directories. This method works by identifying directories which include at least a certain number of files (e.g., 500) belonging to ransomware target file types. FIG. 5B includes the same hypothetical directories 502, 503, 504, 505, 506, and 507, but extends the hypothetical example of FIG. 5A by including a number of files belonging to a ransomware target file type within each directory. In this example, directory 502 contains 1965 files belonging to a ransomware target file type, directory 503 contains 543 such files, directory 504 contains 28 such files, directory 505 contains 26 such files, directory 506 contains 12 such files, and directory 507 contains 0 such files. Since only directories 502 and 503 contain at least 500 files belonging to a ransomware target file type, only directories 502 and 503 are designated as active user directories under this method. Of course, the threshold number of files in FIG. 5B (500) is an example only, and any appropriate threshold number of files may be used.

FIG. 5C illustrates a third way to identify active user directories. This method works by ranking directories by the number of files contained therein that belong to ransomware target file types, and then identifying a specified top percentage (e.g., 50%) of these ranked directories as active user directories. For example, FIG. 5C ranks directories 502, 503, 504, 505, 506, and 507 according to number of files belonging to a ransomware target file type in descending order from most to least. The top 50% of these ranked directories includes directories 502, 503, and 504, and therefore these directories are identified as active user directories. The remaining directories (505, 506, and 507) are not identified. Of course, the specified top percentage in FIG. 5C (50%) is an example only, and any appropriate top percentage parameter may be used.

FIG. 5D illustrates a fourth way to identify active user directories. This method works by ranking directories by the number of files belonging to a ransomware target file type, and then identifying a top number (e.g., 4) of directories. For example, FIG. 5D ranks directories 502, 503, 504, 505, 506, and 507 according to number of files belonging to a ransomware target file type in descending order from most to least. The top 4 directories in this ranked list corresponds to directories 502, 503, 504, and 505. Therefore, these directories are identified as active user directories, while the remaining directories (506 and 507) are not identified. Of course, the specified top number in FIG. 5D (4) is an example only, and any appropriate top number may be used.

FIG. 5E illustrates a fifth way to identify active user directories. This method works by identifying directories with a concentration of ransomware target file types greater than a certain threshold (e.g., 80%). FIG. 5E extends the hypothetical example of FIGS. 5A-D by including a number of files for each directory that does not belong to a ransomware target file type. A "concentration" coefficient can be determined for each directory by calculating the ratio of the number of files belonging to a ransomware target file type to the total number of files within that directory—these concentration coefficients are displayed in the second column from the right in FIG. 5E. In this example, only the concentration coefficients for directories 503, 504, and 506 exceed the specified percentage threshold (e.g., 80%). Therefore, directories 503, 504, and 506 are designated as active user directories, while the remaining directories are not designated. Although the specified percentage threshold was set at 80% in the example illustrated in FIG. 5E, the specified percentage may be an adjustable parameter. In some embodiments, the specified percentage threshold may be a number that is at least one of between 50% and 75%, between 75% and 90%, between 90% and 100%, and 100%. Indeed, any appropriate specified percentage threshold may be used.

FIG. 5F illustrates a sixth way to identify active user directories. This method works by ranking directories by their concentration of ransomware target file type, and then identifying a specified top percentage (e.g., top 33%) of the ranked directories. FIG. 5F includes the same directories depicted in FIG. 5E except that the order of the directories has been changed to rank them according to their concentration coefficients, from highest to lowest. In this example, directories 506 and 503 fall within the specified top percentage (33%) of the ranked directories. Directories 506 and 503 are therefore designated as active user directories, while the remaining directories are not designated. Of course, the specified top percentage (33%) in FIG. 5F is an example only, and any appropriate top percentage may be used.

FIG. 5G illustrates a seventh way to identify active user directories. This method works by ranking directories by their concentration of ransomware target file types, and then identifying a specified top number (e.g. 4) of the ranked directories. FIG. 5G includes the same directories depicted in FIG. 5F. Just as in FIG. 5F, these directories have been ranked according to their concentration coefficients, from highest to lowest. In this example, directories 506, 503, 504, and 502 fall within the specified top number (4) of the ranked directories. Directories 506, 503, 504, and 502 are therefore designated as active user directories, while the remaining directories are not designated. Of course, the specified top number (4) in FIG. 5G is an example only, and any appropriate top number may be used.

FIGS. 5A through 5G evaluates each directory 502, 503, 504, 505, 506, and 507 separately, even though directory 506 (C:\Users\Username\My Pictures), directory 503 (C:\Users\Username\My Documents), and directory 504 (C:\Users\Username) are all contained within a common parent directory (C:\Users). FIG. 5H illustrates an alternate way to evaluate these directories: instead of treating each directory 502 through 507 as separate directories, the method illustrated in FIG. 5H can evaluate only top- or mid-level directories, without separately accounting for sub-directories below a certain level. Under this method, for instance, directories 506, 503, and 504 would not be evaluated as three separate directories, but would be evaluated only as a single, consolidated directory 508. This consolidated directory 508 (C:\Users) would be considered to contain 583 files belonging to a ransomware target file type (e.g., 12 files from directory 506+543 files from directory 503+28 files from directory 504=583 files), and 40 files not belonging to a ransomware target file type (e.g., 0 files from directory 506+34 files from directory 503+6 files from directory 504=40 files). Since directories 502, 505, and 507 are not subsets of the C:\Users file path, they would continue to be considered as separate directories. Any of the methods discussed above in relation to FIGS. 5A through 5G can then be applied to directories 502, 505, 507, and consolidated directory 508. By not considering sub-directories below a certain file structure level, the method illustrated in FIG. 5H can simplify the process for identifying active user directories.

Figure 6:
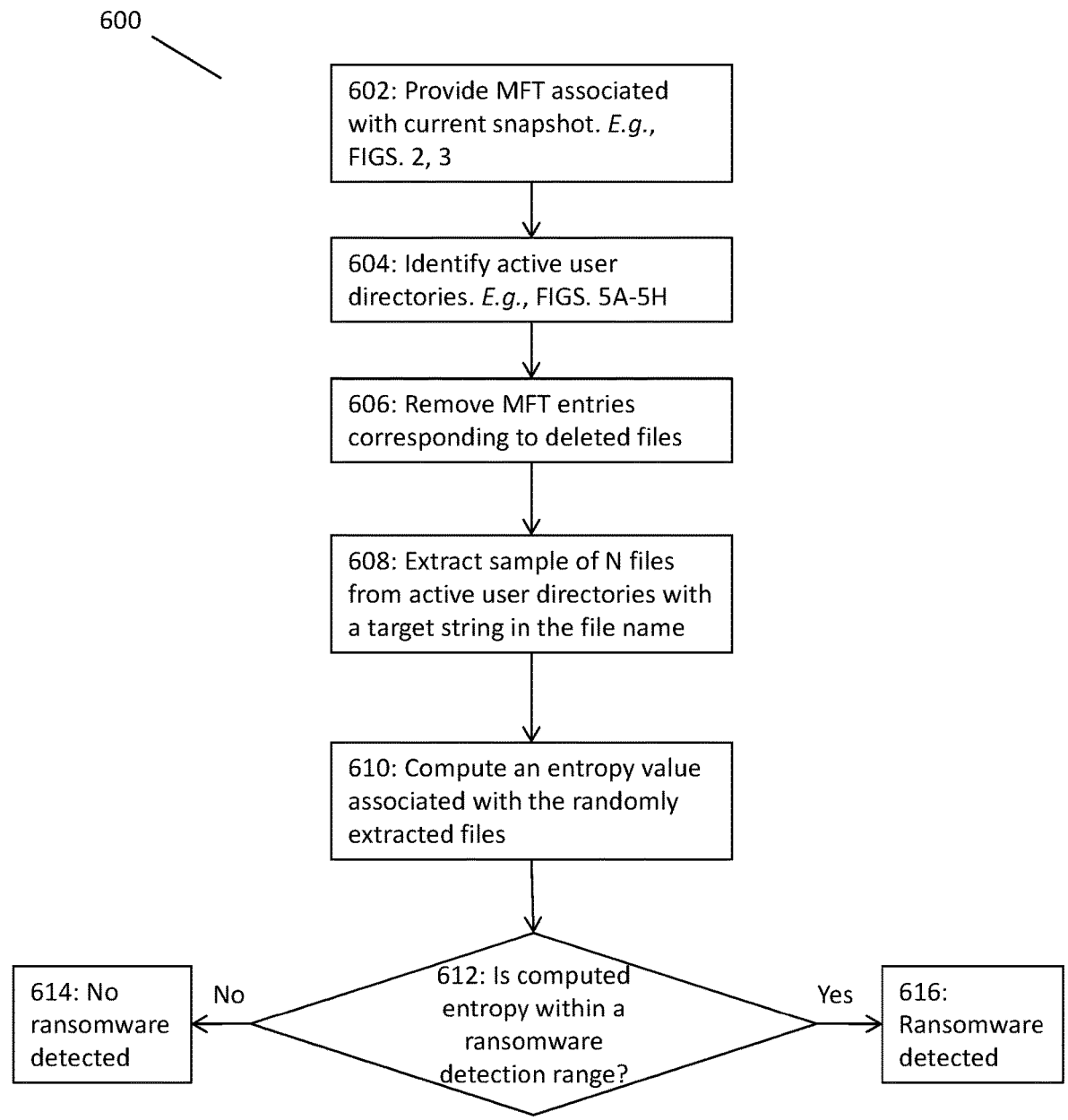
FIG. 6 is a flowchart depicting an exemplary process for implementing a second type of test for detecting ransomware, according to some embodiments.

FIG. 6 is a flowchart depicting an exemplary process 600 for implementing a second type of test for detecting ransomware, according to some embodiments. This second type of test can correspond to dataflow 117 depicted in FIG. 1. Although dataflow 117 is illustrated in association with ransomware detection server 106 in FIG. 1, any part of process 600 can be implemented by any or any combination of client device 102, computer 104, snapshot server 103, and ransomware detection server 106. At a high level, process 600 also exploits two features of ransomware to detect its effects on a filesystem. First, as mentioned above in relation to FIG. 4, ransomware tends to target only specific file types (e.g., ransomware target file types) within certain filesystem directories (e.g., active user directories) for infection, while leaving other types of files and/or other directories unaffected. Second, since ransomware generally encrypts the files that it infects, and since encryption will increase the randomness of an infected file's contents, a ransomware infection can be detected by measuring the entropy (i.e., randomness or information density) of a file, or a collection of files. As used herein, "entropy" refers to any measure or indication of randomness or information density, and references to the "entropy" of one or more files refers to any measure or indication of the randomness or information density of all or part of the one or more files' contents. Entropy can be measured or indicated using various types of metrics or tests, including without limitation Monte Carlo pi approximations, Chi-Squared tests, or by computing one or more mean byte values. If the measured entropy indicates a high degree of randomness in the contents of the file (or collection of files), this can be an indication that the file(s) have been infected with ransomware.

Process 600 generally works by computing the entropy of a representative sample of files, and using the computed entropy to distinguish between infected and uninfected filesystems. However, determining how many files to sample can be a challenging problem. Sampling too many files can be computationally expensive, but sampling too few files may result in false positives (e.g., indicating ransomware infection when none exists) or false negatives (failing to identify a ransomware infection). Furthermore, choosing the right files to sample can be a difficult problem. In general, the sample of files need to be chosen in such a way that the computed entropy is a useful discriminator between infected and uninfected systems. The computed entropy should ideally indicate a high degree of randomness for infected filesystems and a low degree of randomness for uninfected filesystems. Simply computing the entropy of a random sample of all files on a filesystem will generally not be sufficient to discriminate between infected and uninfected systems. A more intelligent way of choosing the files to sample is needed.

Turning now to the details of process 600, at step 602, an MFT associated with a current snapshot of source volume 105 is provided. This step can be implemented as part of dataflow 115 in FIG. 1, and can be done by iterating through the MFT entry blocks of the current snapshot of source volume 105 as illustrated in FIG. 3. If process 600 is executed shortly after process 400 in FIG. 4 is executed, the MFT associated with the previous snapshot need not be extracted anew—instead, the MFT provided as part of step 404 may be re-used. In other words, in some embodiments, the MFT associated with the current snapshot may be extracted once (e.g., as part of dataflow 115 in FIG. 1) and then re-used for all subsequent tests, including test 1 (dataflow 116, depicted in FIG. 4), test 2 (dataflow 117, depicted in FIG. 6), and/or test 3 (dataflow 118, described below in association with FIG. 7).

At step 604, process 600 can identify active user directories by analyzing the MFT associated with the previous snapshot of source volume 105 provided at step 602. Different ways of identifying active user directories were described in greater detail above in relation to FIGS. 5A-5H.

At step 606, process 600 can remove MFT entries that correspond to files or directories that have been deleted from the MFT associated with the current snapshot.

At step 608, process 600 can extract a sample of N files from the current snapshot of source volume 105. This sample of N files can be extracted randomly, or according to a deterministic algorithm. To keep the process computationally efficient and lightweight, the number of files extracted (N) can be less than all of the files stored in the current snapshot, i.e., the sample of N files extracted can be a proper subset of all files in the current snapshot. N can be an adjustable parameter that can be set to any appropriate integer number, and in some exemplary embodiments may be set to 1, 5, 10, 20, 50, 100, 1000, or more. These N files can be extracted from the set of files in the current snapshot that (i) are stored in an active user directory identified in step 606, and (ii) include a target string in the file name. By randomly extracting only files that fulfill these two conditions, process 600 can more specifically target files that are more likely to be infected by ransomware. As discussed above, files stored in an active user directory are more likely to be infected by ransomware for a variety of reasons. Similarly, filtering for files that include a target string in the file name allows process 600 to target only files that belong (or used to belong) to a ransomware target file type. As discussed above, some types of ransomware will modify a file name by appending a suffix (e.g., ".GOTCHA") to the end of the file name of infected files. Therefore, an infected Word document's file type suffix may change from ".DOCX" to ".DOCX.GOTCHA." By filtering for files that contain the target string ".DOCX" in its file name, step 608 can extract both uninfected .DOCX files, as well as .DOCX files whose file names have been modified by ransomware to include an additional suffix (e.g., ".GOTCHA"). Step 608 may also filter for target strings associated with other ransomware target file types, such as "XLSX", "PPTX", and/or "PDF." In this way, step 608 can target files that belong (or used to belong) to a ransomware target file type.

In some embodiments, step 608 can target files that belong (or used to belong) to a ransomware target file type using methods other than filtering for a target string in the file name. For example, step 608 can identify and target files that belong to ransomware target file types by examining the file's metadata, location on a disk, or revision history. Also in some embodiments, one of the ransomware target file types that step 608 can identify and target can include the Master File Table (MFT) itself.

Targeting files that belong to a ransomware target file type confers at least two advantages. First, as discussed above, files that belong to a ransomware target file type are more likely to be infected by ransomware. Second, uninfected files that belong to a ransomware target file type (e.g., Word or PDF documents) generally exhibit a high degree of structure and order. Therefore, the entropy of a sample of files belonging to a ransomware target file type should indicate a relatively low degree of randomness if the files have not been infected. If the computed entropy of a sample of files belonging to a ransomware target file type indicates a high degree of randomness, this can be an indicator of ransomware infection. Therefore, by filtering for files that both (i) are stored in an active user directory and (ii) include a target string in the file name, process 600 can make the computed entropy a more useful discriminator between infected and uninfected systems. By using these two filters, the parameter N may be set at a relatively low number (e.g., below 10, between 11 and 20, or between 21 and 50) while still enabling process 600 to reliably detect ransomware infection.

At step 610, process 600 can compute an entropy value associated with the randomly extracted files. One way to do this is to concatenate the contents of the N extracted files into one long string, and then calculate the entropy of the concatenated string. Another way to do this is to calculate the entropy of each of the N extracted files to obtain N entropy values, and then averaging the N entropy values into a single entropy value. Entropy values can be calculated using any entropy functions known in the art, such as Ubuntu Linux ENT by Fourmilab.ch (Oct. 20, 1998).

At step 612, process 600 can compare the computed entropy value to a ransomware detection range. In some embodiments, the ransomware detection range can correspond to values of the computed entropy value that indicate the contents of the N extracted files exhibit a high degree of randomness. This ransomware detection range can also include computed entropy values that indicate the contents of the N extracted files are completely random, e.g., knowledge of the contents of one part (e.g., bit or block range) of the file yields no information at all about the contents of any other part (e.g., bit or block range) of the file. Expressed another way, the ransomware detection range can include computed entropy values that indicate the contents of the N extracted files exhibit little to none of the structure or order that is normally present in unencrypted files. In some exemplary embodiments, for example, the computed entropy value can be a mean byte value associated with the contents of the extracted files, and the ransomware detection range can include mean byte values that are greater than or equal to 127.1 and less than or equal to 127.9. If the computed entropy falls within the ransomware detection range, process 600 can branch to step 616, which indicates that ransomware has been detected. If the computed entropy does not fall within the ransomware detection range, process 600 can branch to step 614, which indicates that no ransomware has been detected.

By specifically targeting only files that are likely to be infected by ransomware, process 600 can be executed more quickly and with less computational resources (e.g., memory, CPU cycles) than other methods that indiscriminately analyze all files stored on source volume 105. Furthermore, by targeting only files that are likely to be infected by ransomware, while ignoring files that are likely to be unaffected by ransomware, process 600 can decrease both false positives (falsely indicating ransomware infection when none exists) and false negatives (failing to identify a ransomware infection). Simply calculating the entropy of all files on source volume 105, or even of a randomly extracted but unfiltered sample of files, is likely to be less effective in distinguishing infected filesystems from non-infected filesystems. This is because the difference in the computed entropy for an infected filesystem will likely be not much higher than the computed entropy for an uninfected filesystem, since ransomware tends not to infect a large portion of most filesystems (e.g., windows files, program files). In contrast, by computing an entropy value only for those files that are likely to be infected by ransomware, while ignoring files that are likely to be unaffected by ransomware, the computed entropy for an infected filesystem will generally be much higher than the computed entropy for an uninfected filesystem. This makes the computed entropy value a more useful indicator for discriminating between filesystems that have been infected by ransomware, and uninfected filesystems.

Figure 7:
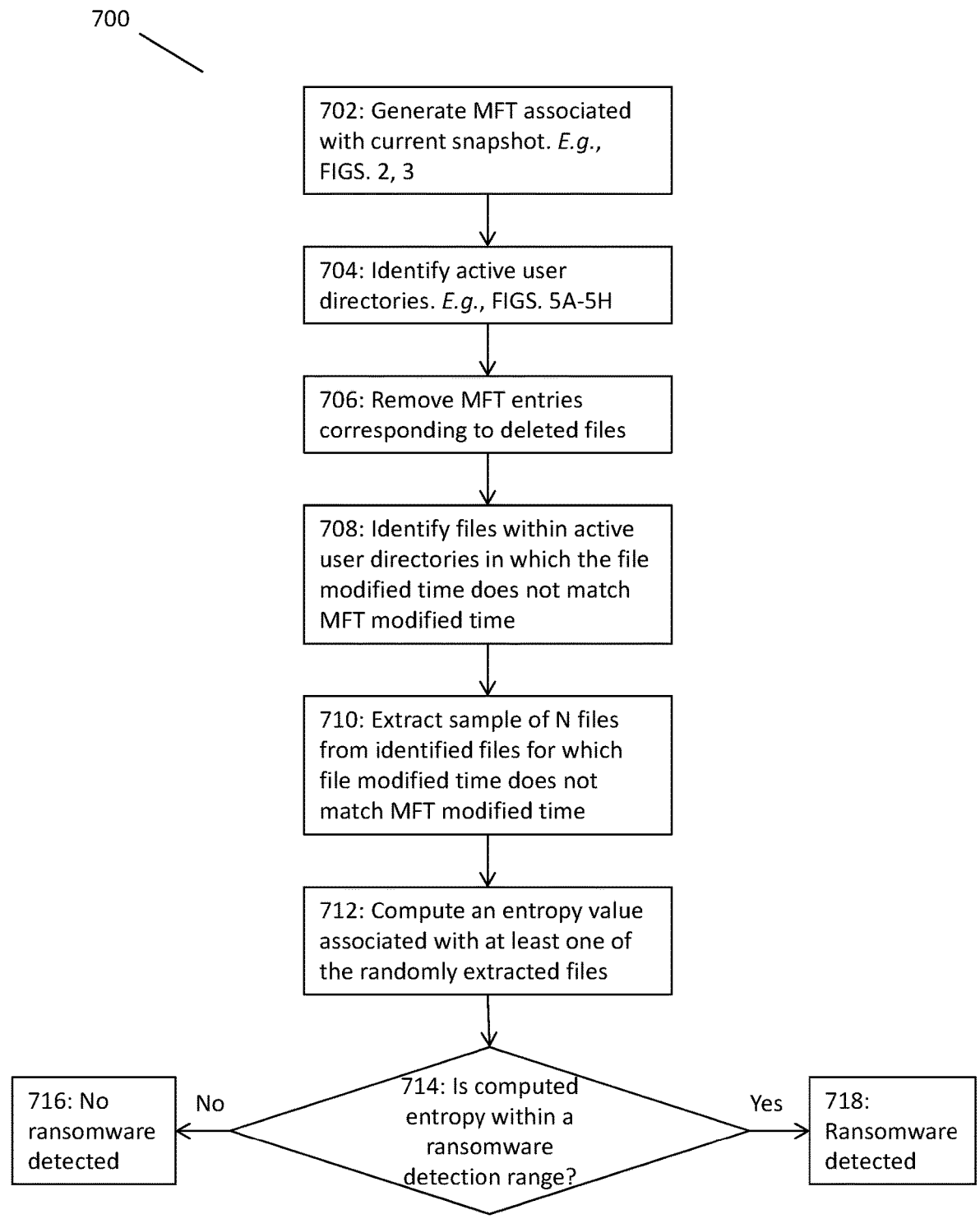
FIG. 7 is a flowchart depicting an exemplary process for implementing a third type of test for detecting ransomware, according to some embodiments.

FIG. 7 is a flowchart depicting an exemplary process 700 for implementing a third type of test for detecting ransomware, according to some embodiments. This third type of test can correspond to dataflow 118 depicted in FIG. 1. Although dataflow 118 is illustrated in association with ransomware detection server 106 in FIG. 1, any part of process 700 can be implemented by any or any combination of client device 102, computer 104, snapshot server 103, and ransomware detection server 106. At a high level, process 700 is substantially similar to process 600 except that it uses a different way to identify the sample of N files for which an entropy value is computed.

Ransomware are generally designed so that its effects on a filesystem can be easily reversed when the user pays the ransom. As a result, although ransomware may encrypt the contents of files, certain common types of ransomware will take care to preserve metadata indicating when a file was last modified. This metadata may be important for sorting or categorizing files in many filesystems, such as filesystems storing image, music, video, or other media files. Therefore, although ransomware may modify the contents of infected files by encrypting them, the ransomware may take care not to alter the infected files' metadata indicating the files' last modified date and time. Ransomware may also avoid modifying this metadata to avoid detection by a filesystem's user until the ransomware has had time to infect all or most of the users' critical files.

This feature of ransomware leaves a detectable trace in the MFT entries corresponding to infected files. The "Standard Information" sub-section of MFT entries (e.g., subsections 202*aa*, 202*ba*, and 202*ca* in FIG. 2) includes two fields: (i) a date and time at which the file was last modified, and (ii) a date and time at which the MFT entry was last modified. For most normal files and in most normal use cases, these two fields will exhibit the same value: the date and time at which the file was last modified will generally also be the date and time at which the MFT entry corresponding to that file was last modified. However, files that have been infected by ransomware may exhibit a mismatch between these two fields. Ransomware will leave the date and time at which the file was last modified by the user unchanged, but the date and time at which the MFT entry was last modified will reflect the time at which the file was encrypted by ransomware. Therefore, the MFT entries corresponding to infected files may exhibit the property that the date and time at which the file was last modified will not match the date and time at which the MFT entry was last modified. While there are some use cases that will result in a mismatch between the file last modified and MFT last modified date/time even when there is no ransomware infection, a file that exhibits both the aforementioned mismatch between modified times as well as a high degree of randomness is likely to be infected by ransomware.

Turning now to the details of process 700, at step 702, an MFT associated with a previous snapshot of source volume 105 is provided. This step can be substantially similar to step 602, described above in relation to FIG. 6.

At step 704, process 700 can identify active user directories by analyzing the MFT associated with the previous snapshot of source volume 105 provided at step 702. This step can be substantially similar to step 604, described above in relation to FIG. 6.

At step 706, process 700 can remove MFT entries that correspond to files or directories that have been deleted. This step can be substantially similar to step 606, described above in relation to FIG. 6.

At step 708, process 700 can identify files within the active user directories in which the file modified time does not match the MFT modified time. As described above, a mismatch between (i) a date and time at which a file was last modified, and (ii) a date and time at which the MFT entry for the file was last modified may be an indication that the file has been infected by ransomware.

At step 710, process 700 can extract a random sample of N files from the set of identified files for which the file modified time does not match the MFT modified time. By filtering only for files in which the mismatch is detected, process 700 can more specifically target files that are likely to be infected by ransomware, thereby improving efficiency and decreasing computational requirements. Furthermore, by targeting only files that are likely to be infected by ransomware, while ignoring files that are less likely to be affected by ransomware, process 700 can decrease both false positives and false negatives.

In some embodiments, step 710 may also be modified so that instead of extracting a random sample of N files, process 700 can extract the N files (i) with MFT entries that have been most recently modified and (ii) for which the file modified time does not match the MFT modified time. By targeting files with MFT entries that have been most recently modified, process 700 can increase the possibility of detecting a recent ransomware infection, since any encryption activity would have likely impacted the most recently modified MFT entries.

At step 712, process 700 can compute an entropy value associated with the files that were extracted at step 710. This step can be substantially similar to step 612, described above in relation to FIG. 6.

At step 714, process 700 can compare the computed entropy value to a ransomware detection range. If the computed entropy falls within the ransomware detection range, process 700 can branch to step 718, which indicates that ransomware has been detected. If the computed entropy does not fall within the ransomware detection range, process 700 can branch to step 716, which indicates that no ransomware has been detected. Steps 714, 716 and 718 can be substantially similar to steps 612, 614, and 616 described above in relation to FIG. 6.

Both FIGS. 6 and 7 may be modified by adding, deleting, editing, or modifying the order of any of their constituent steps. For example, in some embodiments, active user directories may be identified without any reference to a MFT associated with a current snapshot—in such embodiments, steps 602 and 702 may be omitted. Also in some embodiments that do not rely on a MFT, steps 606 and 706 may also be omitted.

Figure 8:
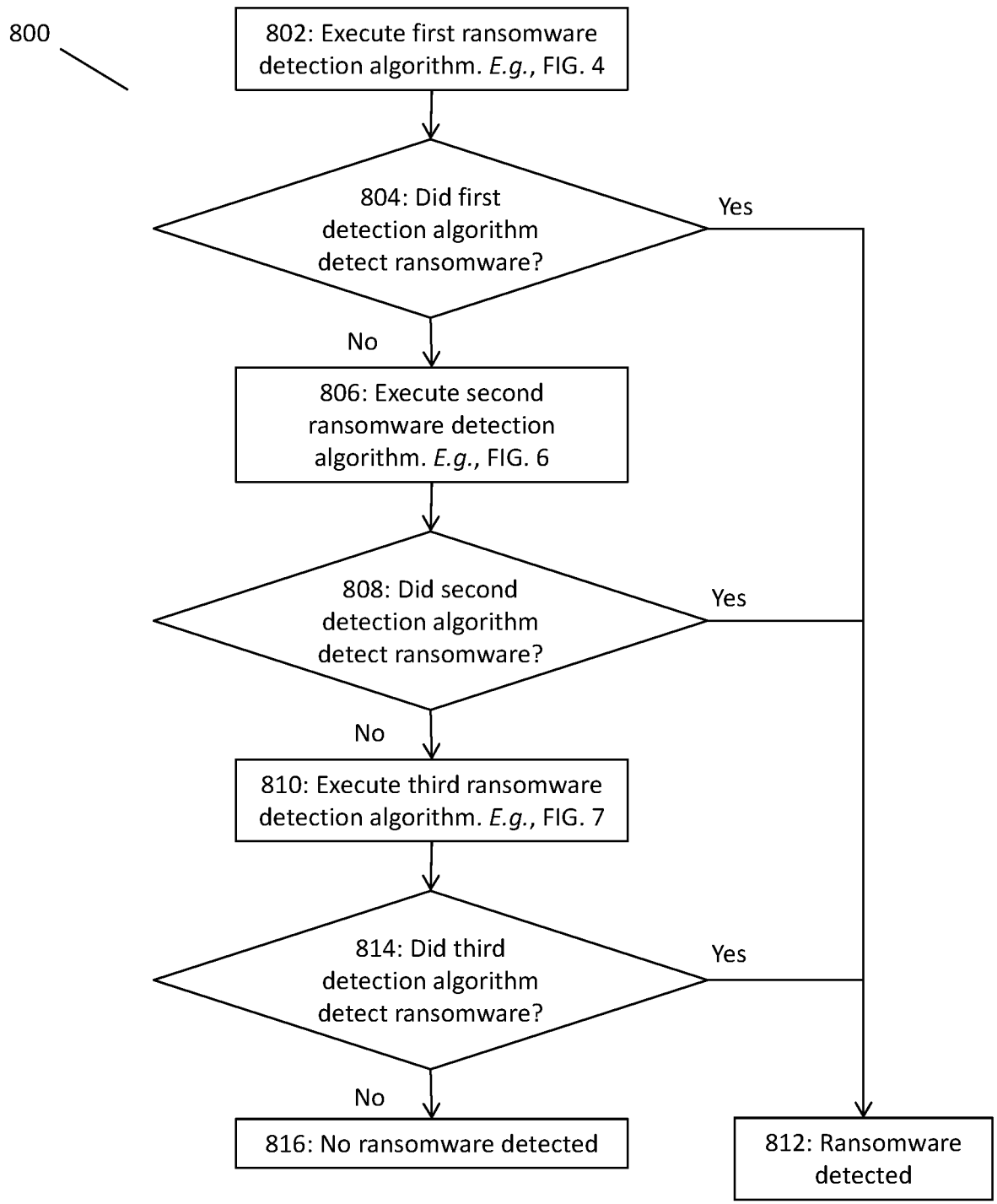
FIG. 8 is a flowchart depicting an exemplary process for combining the first type of test, the second type of test, and/or the third type of test for detecting ransomware, according to some embodiments.

FIG. 8 is a flowchart depicting an exemplary process 800 that combines the first type of test (FIG. 4), the second type of test (FIG. 6), and the third type of test (FIG. 7) to detect ransomware in source volume 105, according to some embodiments. At step 802, process 800 can execute the first type of ransomware detection algorithm (FIG. 4). At step 804, process 800 can determine whether the first type of ransomware detection algorithm detected ransomware. If ransomware is detected, process 800 branches to step 812, which indicates that ransomware has been detected. If ransomware is not detected, process 800 branches to step 806.

At step 806, process 800 can execute the second type of ransomware detection algorithm (FIG. 6). At step 808, process 800 can determine whether the second type of ransomware detection algorithm detected ransomware. If ransomware is detected, process 800 branches to step 812, which indicates that ransomware has been detected. If ransomware is not detected, process 800 branches to step 810.

At step 810, process 800 can execute the third type of ransomware detection algorithm (FIG. 7). At step 810, process 800 can determine whether the third type of ransomware detection algorithm detected ransomware. If ransomware is detected, process 800 branches to step 812, which indicates that ransomware has been detected. Otherwise, process 800 branches to step 816, which indicates that no ransomware has been detected.

FIG. 8 may be modified by adding, deleting, editing, or modifying the order of any of its constituent steps. For example, the three types of ransomware detection algorithms need not be executed in the order presented in FIG. 8, but may be executed in any order. A person of ordinary skill would also appreciate that when these three ransomware detection algorithms are operated in sequence, results generated by earlier-executed algorithms may be re-used in later-executed algorithms in order to save computational resources. For instance, MFTs and active user directories generated and/or identified in earlier steps may be re-used in later-executed algorithms. Instead of using all three types of detection algorithms, process 800 may also be modified to use any two detection algorithms, in any order.

Using multiple types of detection algorithms as illustrated in FIG. 8 may increase the chances of successfully detecting a ransomware infection. Since different algorithms have different strengths and weaknesses, using multiple algorithms in combination allows each algorithm to make up for the weaknesses of other algorithms.

For instance, the first type of test (FIG. 4) may fail to detect ransomware if the ransomware only infects some of the files in active user directories, but does not infect enough files to cause the current ransomware target file count to drop below the ransomware detection threshold. This can occur if the ransomware ignores some of the identified active user directories, or if the ransomware is in the process of infecting the filesystem but has not had a chance to propagate through the filesystem. The first type of test may also fail to detect ransomware if the ransomware encrypts the contents of files but does not change the file type extension. This is because these types of ransomware will not change the current ransomware target file count. More generally, since the first type of test examines only metadata related to files on a filesystem (e.g., the file name, and specifically, the file type extension at the end of file names), and not the full contents of the files, any ransomware that does not change the infected files' metadata but affects only the contents of the files would not be detected by the first type of test. Using the second and third types of tests in conjunction with the first type of test would help catch ransomware infection in these circumstances.

As another example, the second and third types of tests (FIGS. 6 and 7, respectively) may fail to detect ransomware if the computed entropy value associated with the N extracted files does not fall within the ransomware detection range. This can occur for several reasons. For example, the ransomware may not fully encrypt file contents, but may only use pseudo-encryption. Some simple methods of pseudo-encryption, such as simply shifting the bits of a file's contents, may effectively deny a user access to his or her files, but not increase the randomness of the file's contents to the point where it can be detected by the second and third types of tests. As another example, only some of the N extracted files may be infected by ransomware, perhaps because the ransomware has purposely avoided the uninfected files, or at least some of the identified active user directories. In these cases, the set of N extracted files may comprise some infected files exhibiting high randomness, and some uninfected files exhibiting relatively low randomness. If there are too few infected files in the sample of N extracted files, the entropy associated with the N extracted files may not fall within the ransomware detection range, and the second and third types of tests may fail to detect ransomware. In these cases, as well as others, using the first type of test in conjunction with the second and/or third type of test would help to catch ransomware infection more reliably.

Ransomware Detection Controller

Figure 9:
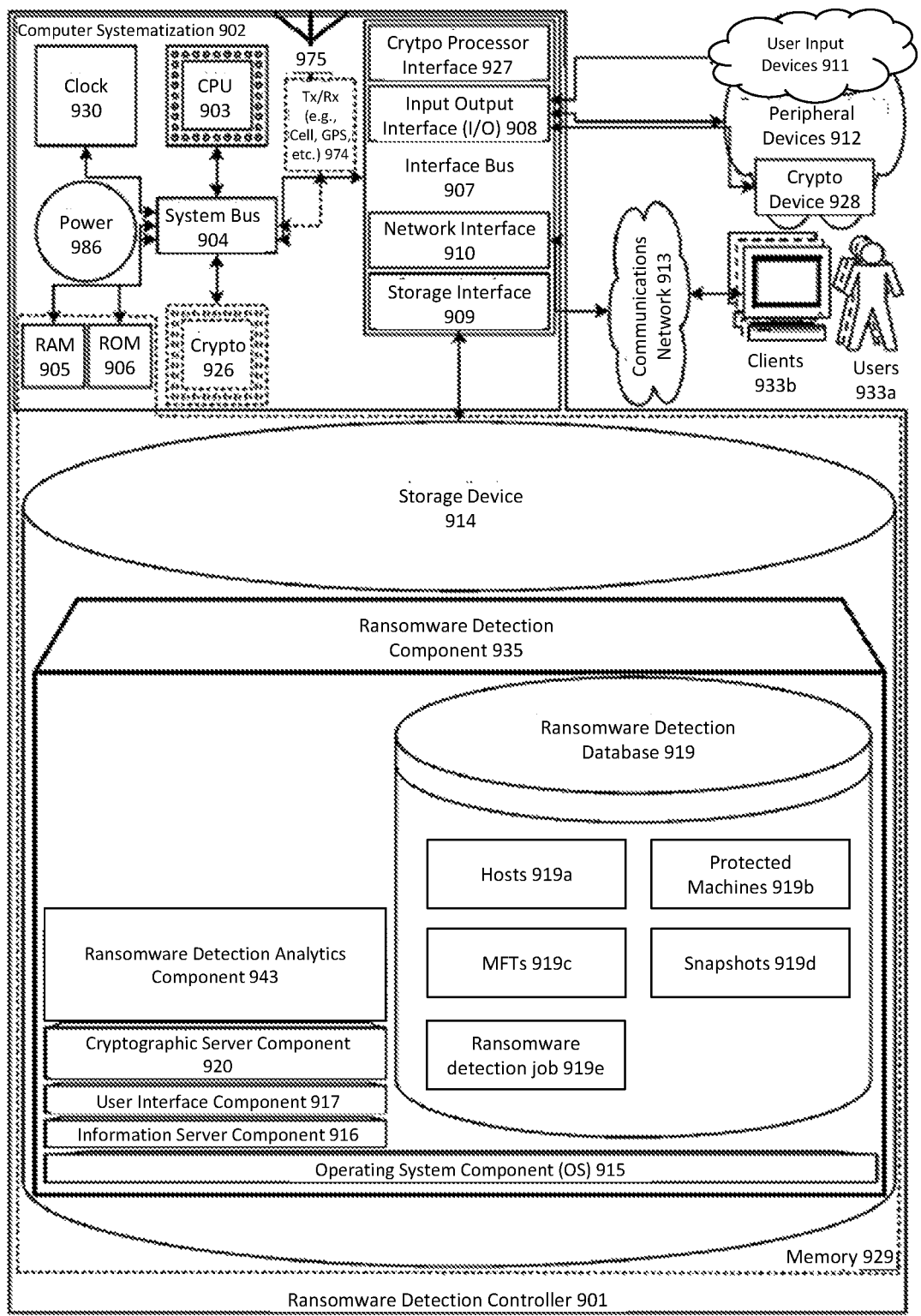
FIG. 9 is a block diagram illustrating embodiments of a ransomware detection controller, according to some embodiments.

FIG. 9 shows a block diagram illustrating embodiments of a ransomware detection controller, according to some embodiments. In this embodiment, the ransomware detection controller 901 may serve to aggregate, process, store, search, serve, identify, instruct, generate, match, and/or facilitate interactions with a computer through various technologies, and/or other related data. The ransomware detection controller can, for example, be configured such that the various components described herein execute on the client device 102, the snapshot server 103, the computer 104, and the ransomware detection server 106. Because each component of the ransomware detection controller may be distributed, as described below, the client device 102, the snapshot server 103, the computer 104, and the ransomware detection server 106 can perform portions of the program logic assigned to them or portions of the program logic normally assigned to the other. In another example, the ransomware detection component 935, the ransomware detection analytics component 943, the cryptographic server component 920, the user interface component 917, and/or the information server component 916 can execute on one or more local servers. In an alternative configuration, the ransomware detection component 935, the ransomware detection analytics component 943, the cryptographic server component 920, the user interface component 917, and/or the information server component 916 can be installed on one or more remote servers and provide services to user 101 and client device 102 via the networked program execution capabilities described below.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ransomware detection controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communication network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ransomware detection controller 901 may be based on computer systems that comprise, but are not limited to, components such as: a computer systematization 902 connected to memory 929.

Computer Systematization

A computer systematization 902 may comprise a clock 930, central processing unit ("CPU(s)" and/or processor(s)" (these terms are used interchangeably throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systematization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communications and/or sensor protocols; for example the antenna(s) may connect to: a Texas Instrument WiLink WL1283 transceiver chip (e.g., providing 802.11n, Bluetooth 3.0, FM, global positioning system (GPS) (thereby allowing the ransomware detection controller to determine its location)); Broadcom BCM4329FKUBG transceiver chip (e.g., providing 802.11n, Bluetooth 2.1+ EDR, FM, etc.); a Broadcom BCM475501UB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systematization. The clock and various components in a computer systematization drive signals embodying information throughout the system. Such transmission and reception of instructions embodying information throughout a computer systematization may be commonly referred to as communications. These communicative instructions may further be transmitted, received, and the cause of return and/or reply communications beyond the instant computer systematization to: communications networks, input devices, other computer systematizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decide allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the ransomware detection controller and beyond through various interfaces. Should processing requirements dictate a greater amount speed and/or capacity, distributed processors, mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the ransomware detection controller may be achieved by implementing a microcontroller such as CAST's R8051XC2 microcontroller; Intel's MCS 51 (i.e., 8051 microcontroller); and/or the like. Also, to implement certain features of the ransomware detection controller, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ransomware detection controller's component collection (distributed or otherwise) and/or features may be implemented via the microprocessor and/or via embedded components; e.g., via ASIC, coprocessor, DSP, FPGA, and/or the like. Alternately, some implementations of the ransomware detection controller may be implemented with embedded components that are configured and used to achieve a variety of features or signal processing.

Depending on the particular implementation, the embedded components may include software solutions, hardware solutions, and/or some combination of both hardware/software solutions. For example, ransomware detection controller features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the ransomware detection controller features. A hierarchy of programmable interconnects allow logic blocks to be interconnected as needed by the ransomware detection controller system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the ransomware detection controller may be developed on regular FPGAs and then migrated into a fixed version that more resembles ASIC implementations. Alternate or coordinating implementations may migrate ransomware detection controller features to a final ASIC instead of or in addition to FPGAs. Depending on the implementation all of the aforementioned embedded components and microprocessors may be considered the "CPU" and/or "processor" for the ransomware detection controller.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the ransomware detection controller thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the ransomware detection controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers architectures may similarly be employed to pool, load balance, and/or otherwise increase the communicative bandwidth required by the ransomware detection controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 912 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the ransomware detection controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the ransomware detection controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the ransomware detection controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the ransomware detection controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component 915; information server component 916; user interface component 917; cryptographic server component 920; ransomware detection analytics component 943; and/or the like (i.e., collectively a component collection). The aforementioned components may be incorporated into (e.g., be sub-components of), loaded from, loaded by, or otherwise operatively available to and from the ransomware detection component(s) 935.

Any component may be stored and accessed from the storage devices and/or from storage devices accessible through an interface bus. Although program components such as those in the component collection, typically, are stored in a local storage device 914, they may also be loaded and/or stored in other memory such as: remote "cloud" storage facilities accessible through a communications network; integrated ROM memory; via an FPGA or ASIC implementing component logic; and/or the like.

Operating System Component

The operating system component 915 is an executable program component facilitating the operation of the ransomware detection controller. Typically, the operating system facilitates access of I/O, network interfaces, peripheral devices, storage devices, and/or the like. The operating system may be a highly fault tolerant, scalable, and secure system such as: Unix and Unix-like system distributions (such as AT&T's UNIX; Berkley Software Distribution (BSD) variations such as FreeBSD, NetBSD, OpenBSD, and/or the like; Linux distributions such as Red Hat, Debian, Ubuntu, and/or the like); and/or the like operating systems. However, more limited and/or less secure operating systems also may be employed such as Apple OS-X, Microsoft Windows 2000/2003/3.1/95/98/CE/Millenium/NT/Vista/XP/Win7 (Server), and/or the like. An operating system may communicate to and/or with other components in a component collection, including itself, and/or the like. Most frequently, the operating system communicates with other program components, user interfaces, and/or the like. The operating system, once executed by the CPU, may enable the interaction with communications networks, data, I/O, peripheral devices, program components, memory, user input devices, and/or the like. The operating system may provide communications protocols that allow the ransomware detection controller to communicate with other entities through a communications network 913. Various communication protocols may be used by the ransomware detection controller as a subcarrier transport mechanism for interaction, such as, but not limited to: multicast, TCP/IP, UDP, unicast, and/or the like.

Information Server Component

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., ICQ, Internet Relay Chat (IRC), Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Representational State Transfer (REST) and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ransomware detection controller based on the remainder of the HTTP request. For example, a request such as http:// 123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ransomware detection database component 919, operating system component 915, other program components, user interfaces, and/or the like.

Access from the Information Server Component 916 to the ransomware detection database component 919 may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ransomware detection controller. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ransomware detection controller as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser. Also, an information server may contain, communicate, generate, obtain, and/or provide program component, system, user, and/or data communications, requests, and/or responses.

User Interface Component

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows, web interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating system component 915, other program components, and/or the like. The user interface may contain, communicate, generate, obtain, and/or provide program component, system, user, and/or data communications, requests, and/or responses.

Cryptographic Server Component

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael (AES), RSA, Secure Hash Algorithm (SHA), Secure Socket Layer (SSL), Secure Hypertext Transfer Protocol (HTTPS), and/or the like. Employing such encryption security protocols, the ransomware detection controller may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the ransomware detection controller component to engage in secure transactions if so desired. The cryptographic component facilitates the secure accessing of resources on the ransomware detection controller and facilitates the access of secured resources on remote systems; i.e., it may act as a client and/or server of secured resources. Most frequently, the cryptographic component communicates with information server component 916, operating system component 915, other program components, and/or the like. The cryptographic component may contain, communicate, generate, obtain, and/or provide program component, system, user, and/or data communications, requests, and/or responses.

Ransomware Detection Database Component

The ransomware detection database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ransomware detection database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the ransomware detection database component 919 includes several tables 919 a-e. A hosts table 919a may contain columns such as host ID, host IP address, host last backup time, host last snapshot time, host up time, and OS version. Protected Machines table 919b may contain columns such as image backup ID, image type, is_baseImage, is_incremental, and image creation time. MFTs table 919c may contain columns such as snapshot ID and MFT export path. Snapshots table 919d may contain columns such as snapshot ID, image backup ID, and snapshot time stamp. Snapshot images may be VMDK images. Ransomware detection job table 919e may contain columns such as ransomware detection job ID, test start time, and test result.

In one embodiment, user programs may contain various user interface primitives, which may serve to update the ransomware detection controller. Also, various accounts may require custom database tables depending upon the environments and the types of clients the ransomware detection controller may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919 a-c. The ransomware detection controller may be configured to keep track of various settings, inputs, and parameters via database controllers.

The ransomware detection database may communicate to and/or with other components in a component collection, including itself, and/or facilities of the like. Most frequently, the ransomware detection database communicates with the ransomware detection analytics component 943, the ransomware detection component 935, other program components, and/or the like. The database may contain, retain, and provide information regarding other nodes and data.

Ransomware Detection Analytics Component

The ransomware detection component 943 is a stored program component that is executed by a CPU. In one embodiment, the ransomware detection component 943 incorporates any and/or all combinations of the aspects of the systems and/or methods for detecting ransomware that was discussed in the previous figures. As such, the ransomware detection component 943 affects accessing, obtaining and the provision of information, services, transactions, and/or the like across various communications networks. The ransomware detection component 943 determines the appropriate files and directories to analyze based on the description herein. As a consequence, more image backups of source volumes may be analyzed in less time and with fewer computational resources (e.g., less memory, less processor cycles, and the like), and false positives and false negatives may be reduced. In many cases, such reduction in time and computational resources required will reduce the capacity and structural infrastructure requirements to support the ransomware detection controller's features and facilities, and in many cases reduce the costs, energy consumption/requirements, and extend the life of the ransomware detection controller's underlying infrastructure; this has the added benefit of making the ransomware detection controller more reliable. Similarly, many of the features and mechanisms are designed to be easier for users to use and access, thereby broadening the audience that may enjoy/employ and exploit the feature sets of the ransomware detection controller; such ease of use also helps to increase the reliability of the ransomware detection controller. In addition, the feature sets include heightened security as noted via the Cryptographic components 920, 926, 928 and throughout, making access to the features and data more reliable and secure.

The ransomware detection analytics component 943 enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery; jQuery UI; MooTools; Prototype; script.aculo.us; Simple Object Access Protocol (SOAP); SWFObject; Yahoo! User Interface; and/or the like), WebObjects, and/or the like. In one embodiment, the ransomware detection analytics component 943 employs a cryptographic server to encrypt and decrypt communications. The ransomware detection analytics component 943 may communicate to and/or with other components in a component collection, including itself, and/or facilities of the like. Most frequently, the ransomware detection analytics component 943 communicates with the ransomware detection database component 919, operating system component 915, other program components, and/or the like. The ransomware detection analytics component 943 may contain, communicate, generate, obtain, and/or provide program component, system, user, and/or data communications, requests, and/or responses.

Distributed Ransomware Detection Components

The structure and/or operation of any of the ransomware detection controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ransomware detection controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, Representational State Transfer (REST), process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

The current disclosure also includes an appendix comprising exemplary code for implementing some of the methods and systems for detecting ransomware disclosed herein.

The invention claimed is:

1. A computer-implemented method for detecting ransomware infection of an image-based backup of a filesystem, the method comprising:
  identifying a plurality of ransomware target file types;
  conducting a first test for ransomware infection of a current image-based backup of the filesystem, the first test comprising:
    providing a current Master File Table (MFT) representation associated with the current image-based backup of the filesystem;
    identifying a plurality of previous active user directories from a previous MFT associated with a previous image-based backup of the filesystem;
    determining, using the current MFT representation associated with the current image-based backup, a current ransomware target file count of a total number of ransomware target files included in a plurality of current active user directories included in the current image-based backup that are associated with any of the identified plurality of ransomware target file types, and that are included within the plurality of previous active user directories associated with the previous image-based backup, and
    when the current ransomware target file count is less than a ransomware detection threshold value, outputting a signal indicating that the first test has detected possible ransomware infection in the current image-based backup;

conducting a second test for ransomware infection of a current image-based backup of the filesystem, the second test comprising:

extracting a plurality of files that are associated with any of the plurality of ransomware target file types from the plurality of current active user directories, wherein the extracted plurality of files is a proper subset of all files associated with the identified plurality of ransomware target file types stored in the plurality of current active user directories and the extracted plurality of files includes substantially only files within the plurality of current active user directories that have a filename including a textual string associated with a filename extension included in the identified plurality of ransomware target file types, calculating an entropy value associated with the plurality of extracted files that are associated with any of the plurality of ransomware target file types from the plurality of current active user directories; and outputting a signal indicating that the second test has detected possible ransomware infection based on the calculated entropy value associated with the plurality of extracted files that are associated with any of the plurality of ransomware target file types from the plurality of current active user directories; and conducting a third test for ransomware infection of a current image-based backup of the filesystem, the third test comprising:

identifying, using the current MFT representation associated with the current image-based backup, current active user directories with a MFT file entry indicating a date and time when the associated file was last modified nonmatching a date and time when the MFT file entry was last modified;

extracting a plurality of files that are identified as indicating a date and time when the associated file was last modified nonmatching a date and time when the MFT file entry was last modified;

calculating an entropy value associated with the plurality of extracted files that are identified as indicating a date and time when the associated file was last modified nonmatching a date and time when the MFT file entry was last modified; and outputting a signal indicating that the third test has detected possible ransomware infection based on the calculated entropy value associated with the plurality of extracted files that are identified as indicating a date and time when the associated file was last modified nonmatching a date and time when the MFT file entry was last modified.

2. The method of claim 1, further comprising outputting a summary signal indicating possible ransomware infection in the current image-based backup when both (i) the signal indicating that the first test has detected possible ransomware infection and (ii) the signal indicating that the second test has detected possible ransomware infection are output.

3. The method of claim 1, further comprising outputting a summary signal indicating possible ransomware infection in the current image-based backup when one or both of (i) the signal indicating that the first test has detected possible ransomware infection and (ii) the signal indicating that the second test has detected possible ransomware infection are output.

4. The method of claim 1, wherein identifying for at least one of the plurality of current and previous active user directories for at least one of the first test and the second test comprises identifying directories that are included within a specified file path.

5. The method of claim 1, wherein identifying for at least one of the plurality of current and previous active user directories for at least one of the first test and the second test comprises identifying a directory as an active user directory based on a number of files included in the previous image-based backup that belong to any of the plurality of ransomware target file types.

6. The method of claim 1, wherein identifying for at least one of the plurality of current and previous active user directories for at least one of the first test and the second test comprises identifying a directory as an active user directory if a ratio of
  (i) a number of files stored within the directory that belong to any of the plurality of ransomware target file types, and
  (ii) a total number of files stored within the directory exceeds a predetermined concentration threshold.

7. The method of claim 1, further comprising extending an age-out period for image-based backups in response to outputting at least one of the signal indicating that the first test has detected possible ransomware infection and the signal indicating that the second test has detected possible ransomware infection.

8. The method of claim 1, further comprising designating the previous image-based backup as a protected backup in response to outputting at least one of the signal indicating that the first test has detected possible ransomware infection and the signal indicating that the second test has detected possible ransomware infection.

9. The method of claim 1, further comprising deleting the current image-based backup in response to outputting at least one of the signal indicating that the first test has detected possible ransomware infection and the signal indicating that the second test has detected possible ransomware infection.

10. The method of claim 1, further comprising isolating at least one subsection of the filesystem in response to outputting at least one of the signal indicating that the first test has detected possible ransomware infection and the signal indicating that the second test has detected possible ransomware infection.

11. The method of claim 1, wherein:
the first test further comprises determining a previous ransomware target file count from a number of files included in the previous image-based backup that are associated with any of the plurality of ransomware target file types, and that are included within the plurality of previous active user directories for the first test; and the signal indicating that the first test has detected possible ransomware infection is output only when the previous ransomware target file count is greater than a minimum use threshold value.

12. The method of claim 1, wherein the extraction of the plurality of files that are associated with any of the plurality of ransomware target file types from the plurality of current active user directories is a random extraction of a proper subset of the plurality of files that are associated with any of the plurality of ransomware target file types from the plurality of current active user directories that include substantially only files within the plurality of current active user directories that have a filename including a textual string associated with a filename extension included in the identified plurality of ransomware target file types.

13. The method of claim 1, further comprising concatenating contents of the extracted plurality of files that are associated with any of the plurality of ransomware target file types from the plurality of current active user directories to form a concatenated file, wherein calculating the entropy value associated with the plurality of extracted files that are associated with any of the plurality of ransomware target file types from the plurality of current active user directories includes calculating an entropy of the concatenated file, and wherein the signal indicating that the second test has detected possible ransomware infection is output when the entropy of the concatenated file falls within a ransomware detection range.

14. The method of claim 1, wherein calculating the entropy value associated with the plurality of extracted files that are associated with any of the plurality of ransomware target file types from the plurality of current active user directories comprises calculating an entropy for each file of the plurality of extracted files, and then averaging the calculated entropy for each extracted file.

15. The method of claim 1, wherein the plurality of ransomware target file types includes at least one of the following file types: Word files, Excel files, PowerPoint files, PDF files, and MFT files.

16. The method of claim 1, wherein a file is considered to belong to one of the plurality of ransomware target file types if the file name contains a target string.

17. The method of claim 1, wherein calculating the entropy value associated with the plurality of extracted files that are associated with any of the plurality of ransomware target file types from the plurality of current active user directories comprises calculating a mean byte square value, and the signal indicating that the second test has detected possible ransomware infection is output when the calculated mean byte square value is greater than or equal to 127.1 and less than or equal to 127.9.

18. A computer-implemented method for detecting ransomware infection of an image-based backup of a filesystem, the method comprising:
  identifying a plurality of ransomware target file types;
  providing a current Master File Table (MFT) representation associated with a current image-based backup of the filesystem;
  identifying a plurality of previous active user directories from a previous MFT associated with a previous image-based backup of the filesystem;
  determining a previous ransomware target file count of a number of files included in the previous image-based backup that are associated with any of the plurality of ransomware target file types, and that are included within the plurality of previous active user directories;
  determining, using the current MFT representation, a current ransomware target file count of a number of files included in the current image-based backup that are associated with any of the plurality of ransomware target file types, and that are included within the plurality of current active user directories;
  outputting a signal indicating possible ransomware infection in the current image-based backup if the previous ransomware target file count is greater than a minimum use threshold value and the current ransomware target file count is less than a ransomware detection threshold value;
  identifying, using the current MFT representation associated with the current image-based backup, current active user directories with a MFT file entry indicating a date and time when the associated file was last modified nonmatchinq a date and time when the MFT file entry was last modified;
  extracting a plurality of files that are identified as indicating a date and time when the associated file was last modified nonmatchinq a date and time when the MFT file entry was last modified;
  calculating an entropy value associated with the plurality of extracted files that are identified as indicating a date and time when the associated file was last modified nonmatchinq a date and time when the MFT file entry was last modified; and
  outputting a signal indicating possible ransomware infection based on the calculated entropy value associated with the plurality of extracted files that are identified as indicating a date and time when the associated file was last modified nonmatching a date and time when the MFT file entry was last modified.

* * * * *